US012177689B2

(12) United States Patent
Ganesan et al.

(10) Patent No.: US 12,177,689 B2
(45) Date of Patent: Dec. 24, 2024

(54) DETERMINING AN ANTENNA PANEL FOR SIDELINK TRANSMISSION

(71) Applicant: Lenovo (Singapore) PTE. LTD., New Tech Park (SG)

(72) Inventors: Karthikeyan Ganesan, Kronberg im Taunus (DE); Prateek Basu Mallick, Dreieich (DE); Vijay Nangia, Woodridge, IL (US); Ravi Kuchibhotla, Chicago, IL (US)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 0 days.

(21) Appl. No.: 18/182,206

(22) Filed: Mar. 10, 2023

(65) Prior Publication Data
US 2023/0217268 A1     Jul. 6, 2023

Related U.S. Application Data

(63) Continuation of application No. 17/641,051, filed as application No. PCT/IB2020/058285 on Sep. 5, 2020.
(Continued)

(51) Int. Cl.
*H04W 52/10* (2009.01)
*H04L 5/00* (2006.01)
(Continued)

(52) U.S. Cl.
CPC ........... *H04W 16/28* (2013.01); *H04L 5/0051* (2013.01); *H04W 8/005* (2013.01); *H04W 52/10* (2013.01);
(Continued)

(58) Field of Classification Search
CPC ... H04W 16/28; H04W 52/10; H04W 52/242; H04W 52/245; H04W 92/18; H04L 5/0051
See application file for complete search history.

(56) References Cited

U.S. PATENT DOCUMENTS

| 2018/0343604 A1 | 11/2018 | Wu et al. |
| 2018/0359790 A1 | 12/2018 | Ingale et al. |

(Continued)

FOREIGN PATENT DOCUMENTS

| WO | 2018137547 A1 | 8/2018 |
| WO | 2019059739 A1 | 3/2019 |
| WO | 2019079379 A1 | 4/2019 |

OTHER PUBLICATIONS

3GPP, "3rd Generation Partnership Project; Technical Specification Group Radio Access Network; NR; Study on NR Vehicle-to-Everything (V2X) (Release 16)", 3GPP TR 38.885 V16.0.0, Mar. 2019, pp. 1-122.

(Continued)

*Primary Examiner* — Fahmida S Chowdhury
(74) *Attorney, Agent, or Firm* — Kunzler Bean & Adamson

(57) ABSTRACT

Apparatuses, methods, and systems are disclosed for directional transmission/reception of groupcast and unicast communication. One apparatus includes a memory comprising instructions executable by a processor to cause the apparatus to receive a sidelink ("SL") configuration for SL communication, the SL configuration indicating a SL grant and a physical uplink control channel ("PUCCH") resource for hybrid automatic repeat request ("HARQ") feedback. The instructions are executable by the processor to cause the apparatus to transmit a positive acknowledgement on the PUCCH resource based at least in part on the HARQ feedback being disabled.

18 Claims, 13 Drawing Sheets

Related U.S. Application Data

(60) Provisional application No. 62/896,375, filed on Sep. 5, 2019.

(51) Int. Cl.
    *H04W 8/00* (2009.01)
    *H04W 16/28* (2009.01)
    *H04W 52/24* (2009.01)
    *H04W 92/18* (2009.01)

(52) U.S. Cl.
    CPC ....... *H04W 52/242* (2013.01); *H04W 52/245* (2013.01); *H04W 92/18* (2013.01)

(56) References Cited

U.S. PATENT DOCUMENTS

| | | | |
|---|---|---|---|
| 2019/0116605 A1 | 4/2019 | Luo et al. | |
| 2019/0124490 A1 | 4/2019 | Wu et al. | |
| 2019/0306923 A1* | 10/2019 | Xiong | H04J 13/0062 |
| 2020/0077432 A1* | 3/2020 | Xiong | H04L 5/0053 |
| 2020/0178221 A1 | 6/2020 | Byun et al. | |
| 2020/0304253 A1 | 9/2020 | Choi et al. | |
| 2020/0343951 A1 | 10/2020 | Hou et al. | |
| 2021/0006360 A1* | 1/2021 | Asterjadhi | H04L 1/1819 |
| 2021/0006361 A1* | 1/2021 | Asterjadhi | H04L 1/1819 |
| 2021/0099901 A1* | 4/2021 | Huang | H04W 72/12 |
| 2021/0168574 A1 | 6/2021 | Zhang et al. | |
| 2021/0297221 A1* | 9/2021 | Lee | H04L 5/0053 |
| 2021/0314796 A1* | 10/2021 | Hoang | H04W 24/08 |
| 2021/0314917 A1 | 10/2021 | Lee et al. | |
| 2022/0007403 A1* | 1/2022 | Li | H04W 72/23 |
| 2022/0046631 A1 | 2/2022 | Li et al. | |
| 2022/0060286 A1* | 2/2022 | Yoshioka | H04L 1/1854 |
| 2022/0095257 A1 | 3/2022 | Castaneda et al. | |
| 2022/0159583 A1 | 5/2022 | Wang et al. | |
| 2022/0279451 A1* | 9/2022 | Yoshioka | H04W 52/383 |
| 2022/0303909 A1 | 9/2022 | Kwon et al. | |

OTHER PUBLICATIONS

3GPP, "3rd Generation Partnership Project; Technical Specification Group Radio Access Network; Architecture enhancements for 5G System (5GS) to support Vehicle-to-Everything (V2X) services (Release 16) The present", 3GPP TS 23.287 V2.0.0, Aug. 2019, pp. 1-50.

3GPP, "3rd Generation Partnership Project; Technical Specification Group Radio Access Network; Evolved Universal Terrestrial Radio Access (E-UTRA); Physical layer procedures (Release 15)", 3GPP TS 36.213 V15.6.0, Jun. 2019, pp. 1-551.

* cited by examiner

DETERMINING AN ANTENNA PANEL FOR SIDELINK TRANSMISSION

CROSS-REFERENCE TO RELATED APPLICATIONS

This is a continuation application of and claims priority to U.S. patent application Ser. No. 17/641,051 entitled "DETERMINING AN ANTENNA PANEL FOR SIDELINK TRANSMISSION" and filed on Mar. 7, 2022, for Karthikeyan Ganesan, Prateek Basu Mallick, Vijay Nangia, and Ravi Kuchibhotla, which application is incorporated herein by reference. U.S. application Ser. No. 17/641,051 is a national stage filing of International Patent Application No. PCT/IB2020/058285 entitled "DETERMINING AN ANTENNA PANEL FOR SIDELINK TRANSMISSION" and filed on Sep. 5, 2020, for Karthikeyan Ganesan, Prateek Basu Mallick, Vijay Nangia, and Ravi Kuchibhotla, the entire contents of which are incorporated herein by reference for all purposes. See MPEP § 213. International Application PCT/IB2020/058285 claims priority to U.S. Provisional Patent Application No. 62/896,375 entitled "DIRECTIONAL TRANSMISSION/RECEPTION FOR GROUPCAST AND UNICAST" and filed on Sep. 5, 2019, for Karthikeyan Ganesan, Prateek Basu Mallick, Vijay Nangia, and Ravi Kuchibhotla, which application is incorporated herein by reference.

FIELD

The subject matter disclosed herein relates generally to wireless communications and more particularly relates to efficient directional transmission/reception of groupcast and unicast communication.

BACKGROUND

In certain wireless communication systems, Vehicle-to-Everything ("V2X") communication allows vehicles to communicate with moving parts of the traffic system around them. Two resource allocation modes are used in Long-Term Evolution ("LTE") V2X communication which are also considered as a baseline for corresponding resource allocation modes in New Radio ("NR") V2X communication.

BRIEF SUMMARY

Disclosed are procedures for directional transmission/reception of groupcast and unicast communication. Said procedures may be implemented by apparatus, systems, methods, or computer program products.

One method of a user equipment ("UE") includes receiving receive a sidelink ("SL") configuration for SL communication, the SL configuration indicating a SL grant and a physical uplink control channel ("PUCCH") resource for hybrid automatic repeat request ("HARQ") feedback. The method includes transmitting a positive acknowledgement on the PUCCH resource based at least in part on the HARQ feedback being disabled.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
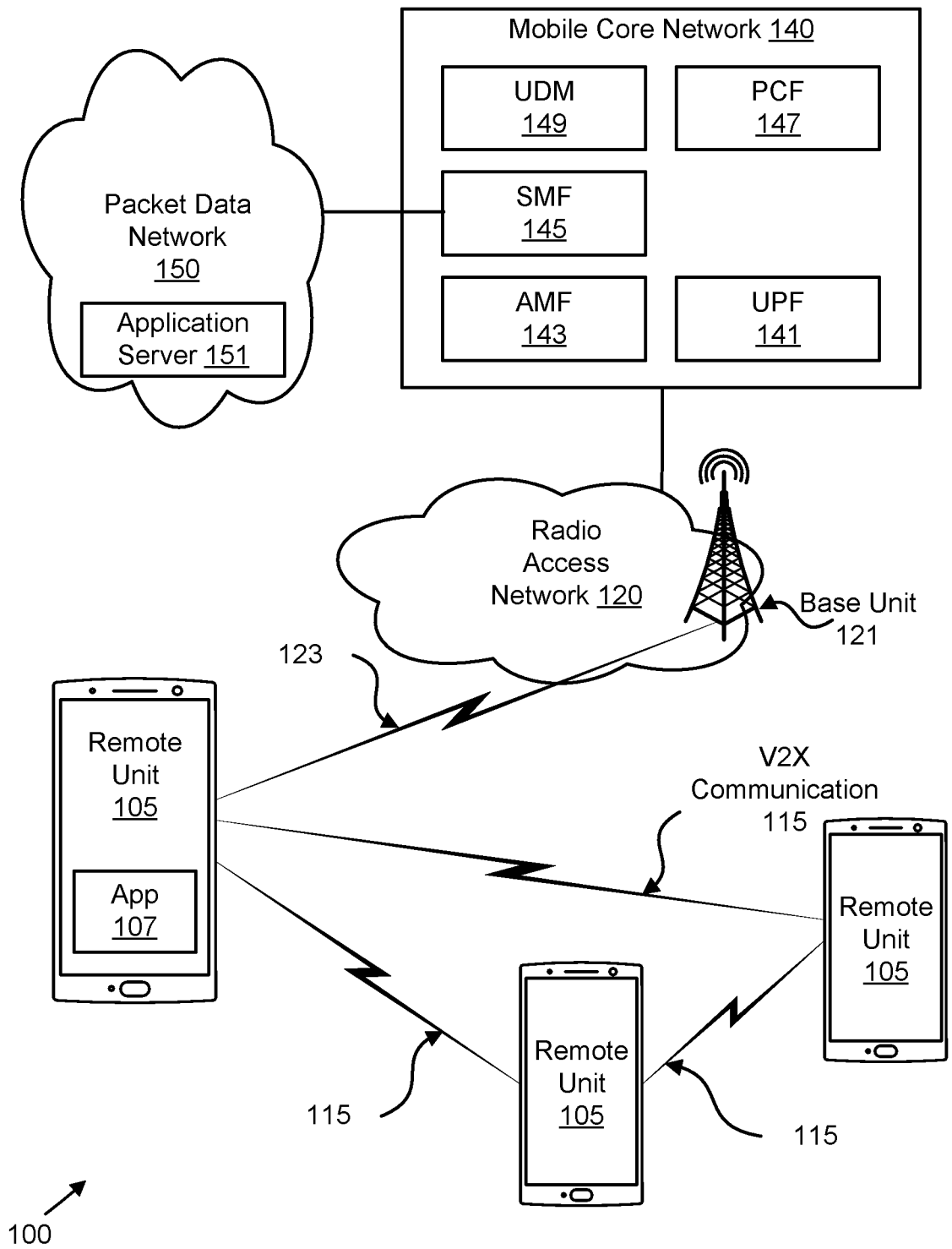
FIG. 1 is a schematic block diagram illustrating one embodiment of a wireless communication system for directional transmission/reception of groupcast and unicast communication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable ROM ("EPROM") (also known as "Flash memory"), a portable compact disc ROM ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for directional transmission/reception of groupcast and unicast communication, e.g., of UEs engaged in V2X communication. In some V2X embodiments, mmWave frequencies (e.g., 13 beyond 6 GHz and beyond 52.6 GHz) introduces challenges like SL beam/panel establishment for unicast transmission between a transmitting UE ("Tx UE") and a receiving UE ("Rx UE"), Beam/Panel switching based on the measurement for unicast transmission, SL beam recovery. NR-Uu in Release 15 standardized Synchronization Signal Block Random Access Channel ("SSB-RACH") correspondence mechanism for initial beam alignment, however in NR PC5 such complex mechanism is not needed because not all UEs transmit SL Synchronization Signal Block ("SL-SSB") transmission. In V2X, the SL synchronization signal ("SLSS") may be transmitted by the SyncRef UE to provide sync source to all nearby UEs (so not all UEs transmit SLSS). Note that if a UE is out-of-coverage, it may search for another UE providing synchronizing reference. Such as UE, if found, is called SyncRef UE. In certain embodiments, unicast session may be also established with UEs that are not transmitting SLSS.

A UE measures two parameters on a reference signal ("RS"): Received Signal Strength Indicator ("RSSI") and Received Signal Received Power ("RSRP"). The carrier RSSI measures the average total received power observed in the measurement bandwidth (e.g., wideband carrier). The total received power of the carrier RSSI includes the power from co-channel serving and non-serving cells, adjacent channel interference, thermal noise, etc., and may include both RS from a serving cell and traffic in the serving cell. RSRP is a RSSI type of measurement and is the linear average of RS power (in Watts) measured over a specified bandwidth (e.g., the resource elements ("REs") that carry cell-specific RSs within the considered measurement frequency bandwidth). In certain embodiments, a minimum of −20 dB Signal-to-Interference-Plus-Noise Ratio ("SINR") is needed to detect RSRP.

For groupcast transmission, selection of antenna panels for desired destination direction to avoid unwanted interference, reduce latency for beam sweeping and the selection of corresponding resource for transmission based on sensing results. As used herein, beam sweeping refers to the source UE transmitting the groupcast in predefined directions/beams in sequence. In certain embodiments, the sequence is indexed, and the sequence/index is transmitted as part of the SL control channel (e.g., in Sidelink Control Information ("SCI")).

One example of antenna panel selection is lane merging where the trajectory alignment for merging lanes, e.g., from right to left, happens with a group of cars in one direction. The destination direction of the V2X message should be somehow related to the panels in the car. Panel selection is also necessary for UE-to-UE relaying for activating the correct panels in car for the multi-hop transmission to relay the message in a particular direction. Note that sensing procedure, which includes candidate resource selection based on Physical Sidelink Control Channel ("PSCCH") decoding and/or RSRP, requires adaptation to include multiple antenna panels in cars.

NR V2X communication may use one of the following SL resource allocation modes. In Mode-1, the RAN node (e.g., gNB) schedules SL resource(s) to be used by UE for SL transmission(s). In Mode-2, the network does not schedule the SL resources; rather, the UE determines SL transmission resource(s) within SL resources configured by BS/network or pre-configured SL resources. As such, Mode-2 covers the cases of: a) the UE autonomously selecting SL resource for transmission; b) the UE being configured with NR configured grant (Type-1 like) for SL transmission; c) the UE scheduling SL transmissions of other UEs; and d) the UE assisting in SL resource selection for other UE(s), a functionality which may be part of any of the above cases.

Note that resource allocation Mode-2 supports reservation of SL resources at least for blind retransmission. Additionally, sensing and resource selection/reselection related procedures are supported for resource allocation Mode-2. In some embodiments, the sensing procedure includes decoding SCI(s) from other UEs and/or SL measurements. Decoding SCI(s) in this procedure provides at least information on SL resources indicated by the UE transmitting the SCI. The sensing procedure uses a L1 SL RSRP measurement based on SL Demodulation Reference Signal ("SL DM-RS") when the corresponding SCI is decoded.

In some embodiments, the resource (re-)selection procedure considered uses the results of the sensing procedure to determine resource(s) for SL transmission and includes the following sub-modes: Mode-2(a) which involves SL sensing and resource selection procedures in the context of a semi-persistent scheme (where resource(s) are selected for multiple transmissions of different transport blocks ("TBs")) and a dynamic scheme (where resource(s) are selected for each transport block ("TB") transmission); Mode-2(c) which is for out-of-coverage operation, Mode-2(c) assumes a (pre-)configuration of single or multiple SL transmission patterns, defined on each SL resource pool. For in-coverage operation, Mode-2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure. A 'pattern' is defined by the size and position(s) of the resource in time and frequency, and the number of resources.

Mode-2(*d*) which, in the context of group-based SL communication, supports a UE-A to inform its serving gNB about members UE-B, UE-C, and so on of a group, and for the gNB to provide individual resource pool configurations and/or individual resource configurations to each group member through UE-A. UE-A cannot modify the configurations, and there is no direct connection required between any member UE and the gNB. Higher-layer only signaling is used to provide the configurations. Such functionality is up to UE capability(ies).

Note that in Mode-2(*a*) occupied SL resources may be identified by decoding of SL control channel transmissions, SL measurements, and/or detection of SL transmissions. Currently, for Mode-2(*a*) it is undetermined how a UE selects resource for PSCCH and Physical Sidelink Shared Channel ("PSSCH") transmission (and other SL physical channel/signals that are defined) and which information is used by UE for resource selection procedure.

In some embodiments, a Tx UE performs direction discovery transmission. Described herein are timing relationship between discovery transmission and feedback reception, as well as resulting resource reservation. Described herein is a method of panel selection for initial SL transmission and reception. Also disclosed is a SL discovery power ramping procedure.

In some embodiments, SL panel/beam switching is based on Radio Link Monitoring ("RLM") measurement. SL direction transmission of data and control may involve assistance information for panel/beam selection for unicast and groupcast transmission, activation of corresponding antenna panel for transmission, and/or mapping of TB on a certain antenna pane. Depending on implementation, a UE may support UL and/or SL transmission from one beam within a panel; with multiple panels, more than one beam (i.e., one beam per panel) may be used for UL/SL transmission. In some implementations, more than one beam per panel may be supported and used for UL/SL transmission.

SL direction sensing procedure may include resource exclusion based on PSCCH decoding and/or L1-RSRP measurement from each antenna panel, candidate resource selection for each antenna panel, and/or assistance information from other UEs for resource exclusion.

In certain embodiments, orthogonal Sidelink Reference Signal ("SL-RS") are assigned for each UE and/or for each UE's active antenna panel/beam. Described herein is a SL power control method considering multiple antenna panel/beam in a car (e.g., containing a V2X UE) where simultaneously different power control methods may be applied. Also described herein are techniques for Channel State Information ("CSI") and/or Channel Quality Indicator ("CQI") reporting for groupcast transmission based on the minimum communication range ("MCR") value.

FIG. 1 depicts a wireless communication system 100 for directional transmission/reception of groupcast and unicast communication for wireless devices communicating V2X messages, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and DL communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a Protocol Data Unit ("PDU") session, Packet Data Network ("PDN") connection, or other data connection with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141. In order to establish the PDU session, the remote unit 105 must be registered with the mobile core network. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 121 may be distributed over a geographic region. In certain embodiments, a base unit 121 may also be referred to as an access terminal, an access point, a base, a base station, a Node-B, an eNB, a gNB, a Home Node-B, a relay node, a RAN node, or by any other terminology used in the art. The base units 121 are generally part of a radio access network ("RAN"), such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes one or more UPFs 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In various embodiments, the mobile core network 140 may also include an Authentication Server Function ("AUSF"), a Network Repository Function ("NRF") (used by the various NFs to discover and communicate with each other over Application Programming Interfaces ("APIs")), a Network Exposure Function ("NEF"), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of control plane and/or user plane network functions. A network instance may be identified by a single network slice selection assistance information ("S-NSSAI"), while a set of network slices for which the remote unit 105 is authorized to use is identified by network slice selection assistance information ("NSSAI"). In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as a Mobility Management Entity ("MME"), a Serving Gateway ("S-GW"), a PDN Gateway ("P-GW"), a Home Subscriber Server ("HSS"), and the like. In certain embodiments, the mobile core network 140 may include an Authentication, Authorization, and Accounting ("AAA") server.

In various embodiments, the remote units 105 may communicate directly with each other (e.g., device-to-device communication) using SL communication links 115. Here, V2X transmissions may occur on V2X resources. As discussed above, a remote unit 105 may be provided with different V2X communication resources for different V2X modes. Mode-1 corresponds to a NR network-scheduled V2X communication mode. Mode-2 corresponds to an NR UE-scheduled V2X communication mode. Mode-3 corresponds to an LTE network-scheduled V2X communication mode. Mode-4 corresponds to an LTE UE-scheduled V2X communication mode.

While FIG. 1 depicts components of a 5G RAN and a 5G core network, the described embodiments for directional transmission/reception of groupcast and unicast communication apply to other types of communication networks and RATs, including Institute of Electrical and Electronics Engineers ("IEEE") 802.11 variants, Global System for Mobile communications ("GSM"), General Packet Radio Service ("GPRS"), Universal Mobile Telecommunications System ("UMTS"), LTE variants, CDMA2000, Bluetooth, ZigBee, Sigfox, and the like. For example, in an LTE variant involving an EPC, the AMF 143 may be mapped to an MME, the SMF mapped to a control plane portion of a P-GW and/or to an MME, the UPF map to a S-GW and a user plane portion of the P-GW, the UDM/UDR maps to an HSS, etc.

In the following descriptions, the term eNB/gNB is used for the base station ("BS") but it is replaceable by any other radio access node, e.g., BS, eNB, gNB, access point, etc. Further the operations are described mainly in the context of 5G NR. However, the proposed solutions/methods are also equally applicable to other mobile communication systems supporting serving cells/carriers being configured for Sidelink Communication over PC5 interface.

Figure 2:
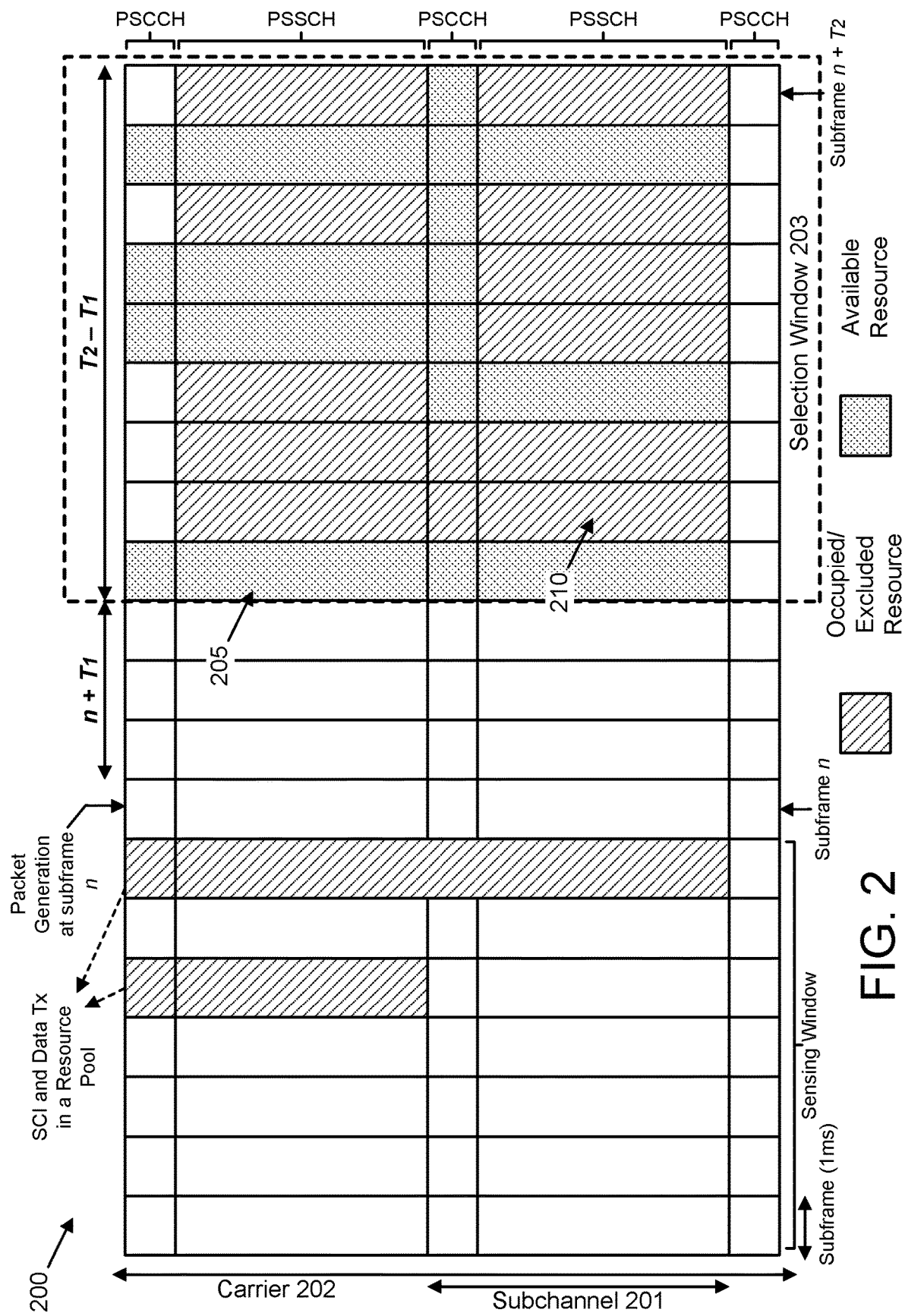
FIG. 2 is a diagram illustrating one embodiment of autonomous resource selection based on sensing.

FIG. 2 depicts a SL resource block pool 200 which provides an example of autonomous resource selection based on sensing. The SL resource block pool 200 includes N subchannels, where resource blocks (i.e., 12 sub-carriers in frequency domain over one NR slot length) are organized into subchannels 201 as configured by higher layer(s) (e.g., by Radio Resource Control ("RRC") layer). A UE may determine the set of resources to be reported to higher layers for PSSCH transmission when requested by higher layers in subframe n for a carrier 202 according to the following steps:

In Step 1, the UE identifies candidate single-subframe resources ("CSRs") 205 from the selection window 203. The selection window 203 is the interval between 'n+$T_1$' and 'n+$T_2$', as shown in FIG. 2. In certain embodiments, $T_1$ is less than 4, while $T_2$ is a value between 20 and 100, selected to fulfill a Packet Delay Budget ("PDB"). In this window 203, the CSRs 205 are selected after filtering out unusable resources 210: first, the UE marks those subframe resources as unavailable if the UE was transmitting in those subframes because the subframes at which a UE transmitted its packet may not be sensed by itself due to half-duplex transmission. Second, the UE excludes resources that are probably used by other UE(s).

In various embodiments, the UE monitors resource usage by other UEs over a sensing window, e.g., up to 1000 subframes in the immediate past. Whether a resource was used or not is determined by decoding PSCCH and the following sub-steps. Step 1-a: Based on the resource reservation and priority field in the SCI format 1, and Step 1-b: Based on the measured SL-RSRP higher than the configured threshold. After excluding resources 210 based on above factors, the remaining resources 205 are called the set "$S_A$." SL direction sensing procedure may include resource exclusion based on PSCCH decoding and/or L1-RSRP measurement from each antenna panel, candidate resource selection for each antenna panel, and/or assistance information from other UEs for resource exclusion. Note that resource exclusion is discussion in further detail below with reference to FIGS. 6A-6C and the fourth solution.

In Step 2, the UE selects a subset $S_B$ from the set $S_A$. If the amount of single-subframe resources in $S_A$ is less than a threshold amount (e.g., 20%) of the entire selection window, then more CSRs 205 are to be identified, i.e., the set $S_A$ is expanded. For this, the RSRP threshold may be raised by a predetermined amount, e.g., by 3 dB, and the above resource exclusion process repeated. When the amount of single-subframe resources in $S_A$ becomes larger than the threshold amount (e.g., 20%), then those CSRs with the smallest RSSI values may be selected, which selection is referred to as "$S_B$". Additionally, the $S_B$ is reported to the Medium Access Control ("MAC") entity of the UE, which randomly selects one of the CSRs in $S_B$ for the transmission. The UE selection of the $T_2$ value for candidate resource selection is to fulfill the latency requirement (e.g., PDB).

Regarding SL Open loop power control, for SL transmit power control, the total SL transmit power is the same in the symbols used for PSCCH/PSSCH transmissions in a slot and the maximum SL transmit power is (pre-)configured to the Tx UE. In LTE-based embodiments, the number of slots per subframe is fixed (e.g., 2 slots per subframe). In NR-based embodiments, the number of symbol (e.g., Orthogonal Frequency Division Multiplexing ("OFDM") symbols) per slot is fixed (e.g., 14 with normal cyclic prefix ("CP") and 12 with extended CP), but the number of slots per radio subframe (i.e., 1 ms length) varies. Note that in NR the symbol duration decreases as the subcarrier spacing increases.

Currently, it is not defined whether/how to handle simultaneous transmission of SL and UL. Also undefined are details on maximum SL transmit power (e.g., whether the maximum power is dependent of parameters such as the priority of PSCCH/PSSCH).

For the SL open-loop power control, a UE may be configured to use DL pathloss (between Tx UE and gNB) only, SL pathloss (between Tx UE and Rx UE) only, or both DL pathloss and SL pathloss. When the SL open-loop power control is configured to use both DL pathloss and SL pathloss, the minimum of the power values given by open-loop power control based on DL pathloss and the open-loop power control based on SL pathloss is taken.

Figure 3A:
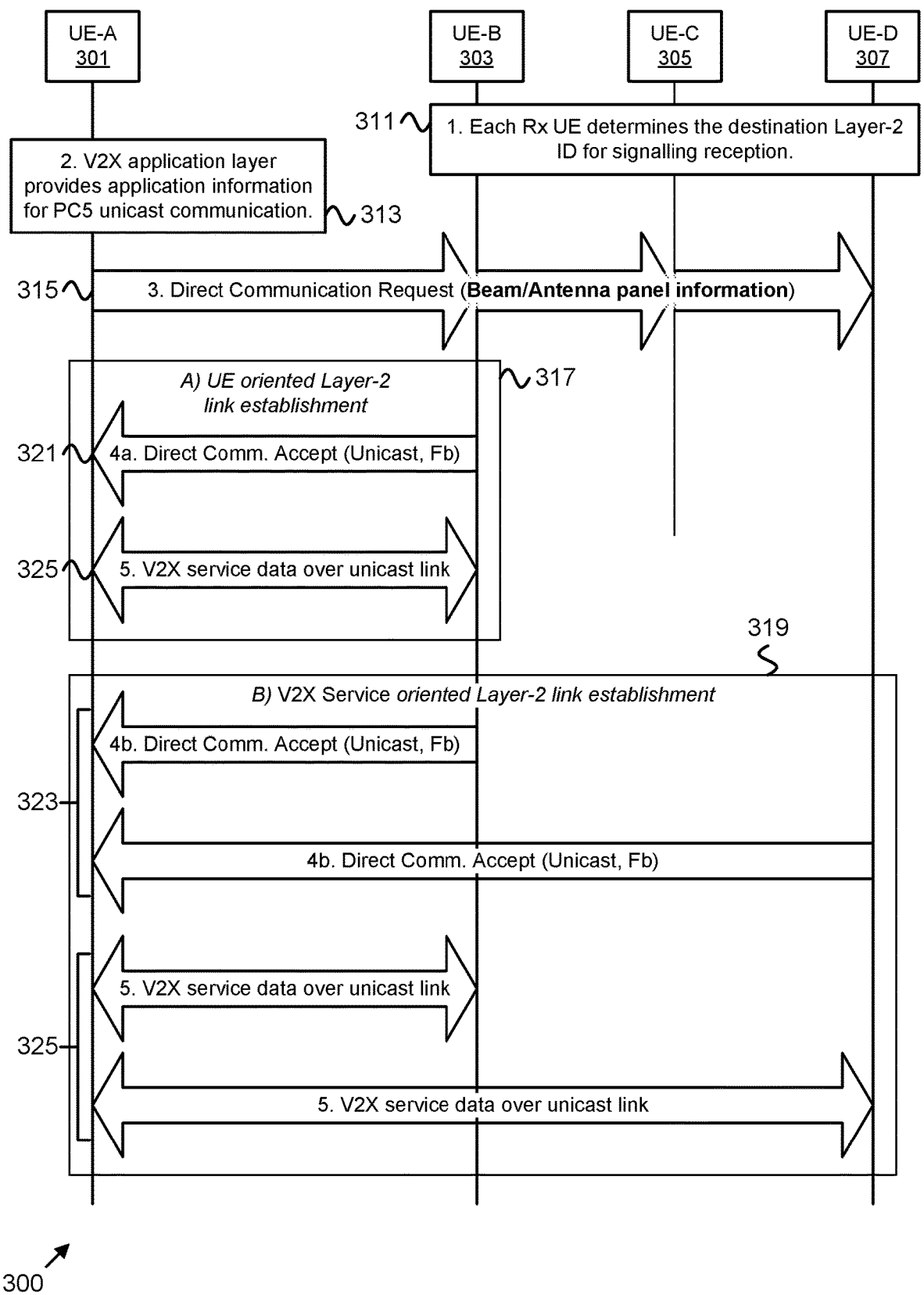
FIG. 3A is a diagram illustrating one embodiment of Layer-2 ("L2") link establishment procedure.

FIG. 3A depicts a procedure 300 for Layer-2 link establishment for unicast mode of V2X communication over PC5 reference point between four V2X UEs, labeled UE-A 301, UE-B 303, UE-C 305, and UE-D 307. In the depicted embodiment, UE-A 301 is the transmitting V2X UE, while UE-B 303, UE-C 305 and UE-D 307 are receiving V2X UEs. Note that a PC5 unicast link is bi-directional, therefore the peer UE of UE-A 301 may send the V2X service data to UE-A 301 over the unicast link with UE-A 301.

At Step 1, the UE(s) determine the destination Layer-2 identifier ("ID") for signaling reception for PC5 unicast link establishment (see block 311). The destination Layer-2 ID is configured with the UE(s).

At Step 2, the V2X application layer in UE-A 301 provides application information for PC5 unicast communication (see block 313). The application information includes the service type(s) (e.g., Provider Service Identifier ("PSID") or Intelligent Transportation Systems Application Identifier ("ITS-AID")) of the V2X application and the initiating UE's Application Layer ID. The target UE's Application Layer ID may be included in the application information. In certain embodiments, the V2X application layer in UE-A 301 may provide service requirements for this unicast communication. UE-A 301 determines the PC5 Quality-of-Service ("QoS") parameters and PC5 QoS Flow Indicator ("PFI"). If UE-A 301 decides to reuse the existing PC5 unicast link, the UE triggers Layer-2 link modification procedure.

At Step 3, the UE-A 301 sends a Direct Communication Request message to initiate the unicast layer-2 link establishment procedure (see messaging 315). The Direct Communication Request message includes: a) Source User Info: the initiating UE's Application Layer ID (i.e., UE-A 301's Application Layer ID); b) V2X Service Info: the information about V2X Service(s) requesting Layer-2 link establishment (e.g., PSID(s) or ITS-AID(s)); c) Indication whether Internet Protocol ("IP") communication is used; d) IP Address Configuration: For IP communication, IP address configuration is required for this link; and e) QoS Info: the information about PC5 QoS Flow(s). For each PC5 QoS Flow, the PFI and the corresponding PC5 QoS parameters (i.e., PC5 QoS Indicator ("PQI") and conditionally other parameters such as Maximum Flow Bit Rate ("MFBR") and/or Guaranteed Flow Bit Rate ("GFBR"), etc.). Note that if the V2X application layer provided the target UE's Application Layer ID in step 2, then is included in the Direct Communication Request message. Target User Info indicates the target UE's Application Layer ID (i.e., UE-B 303's Application Layer ID).

As discussed in further detail below, the Direct Communication Request message may also include Beam and/or Antenna Panel information used to select an optimal Beam and/or Antenna Panel. The UE-A 301 sends the Direct Communication Request message via PC5 broadcast using the source Layer-2 ID and the destination Layer-2 ID.

At Step 4, a Direct Communication Accept message is sent to UE-A 301. Two different options for the Direct Communication Accept message include A) UE oriented Layer-2 link establishment (see block 317) and B) V2X Service oriented Layer-2 link establishment (see block 319):

At Step 4a, (e.g., UE oriented Layer-2 link establishment) if the Target User Info is included in the Direct Communication Request message, the target UE, i.e., UE-B 303 responds with a Direct Communication Accept message (see messaging 321).

At Step 4b, (e.g., V2X Service oriented Layer-2 link establishment) if the Target User Info is not included in the Direct Communication Request message, the UEs that are interested in using the announced V2X Service(s), so decide to establish Layer-2 link with UE-A 301 respond to the request by sending a Direct Communication Accept message (see messaging 323).

In various embodiments, the Direct Communication Accept message includes: a) Source User Info (e.g., Application Layer ID of the UE sending the Direct Communication Accept message); and b) QoS Info (e.g., information about PC5 QoS Flow(s). For each PC5 QoS Flow, the PFI and the corresponding PC5 QoS parameters (i.e., PQI and conditionally other parameters such as MFBR/GFBR, etc.)). Note that the source Layer-2 ID is used to send the Direct Communication Accept message. The destination Layer-2 ID is set to the source Layer-2 ID of the received Direct Communication Request message.

As discussed in further detail below, the Direct Communication Accept message may also include Beam and/or Antenna Panel feedback used to select an optimal Beam and/or Antenna Panel. Upon receiving the Direct Communication Accept message from a peer UE, the UE-A 301 obtains the peer UE's Layer-2 ID for future communication, for signaling and data traffic for this unicast link. The V2X layer of the UE that established PC5 unicast link passes the PC5 Link Identifier assigned for the unicast link and PC5 unicast link related information down to the Access Stratum ("AS") layer. The PC5 unicast link related information includes Layer-2 ID information (i.e., source Layer-2 ID, and destination Layer-2 ID). This enables the AS layer to maintain the PC5 Link Identifier together with the PC5 unicast link related information.

At step 5, the V2X service data is transmitted over the established unicast link (see messaging 325). Here, the PC5 Link Identifier and PFI are provided to the AS layer, together with the V2X service data. The UE-A 301 sends the V2X service data using the source Layer-2 ID (i.e., UE-A 301's Layer-2 ID for this unicast link), and the destination Layer-2 ID (i.e., the peer UE's Layer-2 ID for this unicast link).

Figure 3B:
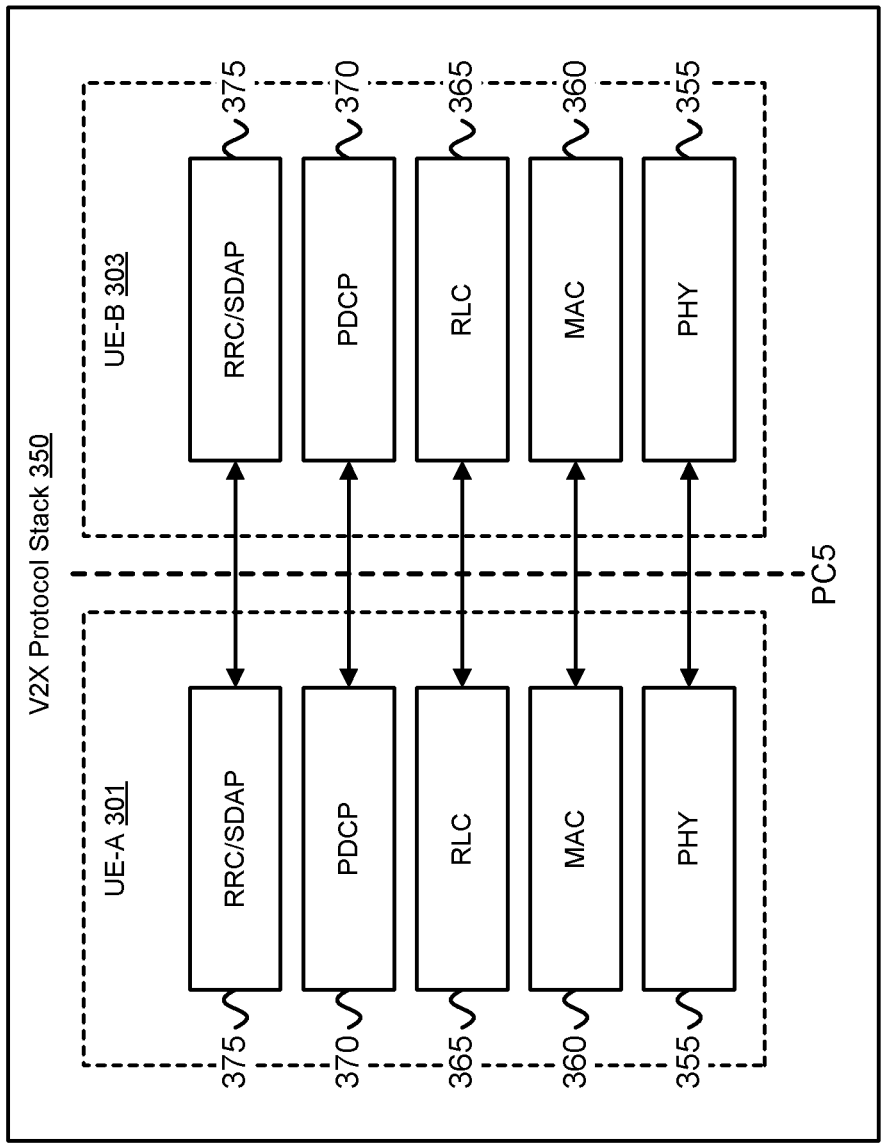
FIG. 3B is a diagram illustrating one embodiment of a V2X protocol stack.

FIG. 3B depicts a V2X protocol stack 350, according to embodiments of the disclosure. While FIG. 3B shows the UE-A 301 and the UE-B 303, these are representative of a set of V2X UEs and other embodiments may involve different V2X UEs. As depicted, the V2X protocol stack (i.e., PC5 protocol stack) includes a physical layer 355, a MAC sublayer 360, a Radio Link Control ("RLC") sublayer 365, a Packet Data Convergence Protocol ("PDCP") sublayer 370, and RRC and Service Data Adaptation Protocol ("SDAP") layers (depicted as combined element "RRC/SDAP" 375), for the control plane and user plane, respectively. The AS protocol stack for the control plane in the PC5 interface consists of at least RRC, PDCP, RLC and MAC sublayers, and the physical layer. The AS protocol stack for the user plane in the PC5 interface consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer and the Non-Access Stratum ("NAS") layer for the control plane and includes, e.g., an IP layer for the user plane. L1 and L2 are referred to as "lower layers", while L3 and above (e.g., transport layer, V2X layer, application layer) are referred to as "higher layers" or "upper layers".

The physical layer 355 offers transport channels to the MAC sublayer 360. The MAC sublayer 360 offers logical channels ("LCHs") to the RLC sublayer 365. The RLC sublayer 365 offers RLC channels to the PDCP sublayer 370. The PDCP sublayer 370 offers radio bearers to the SDAP sublayer. The SDAP sublayer offers QoS flows to 5GC.

Figure 4:
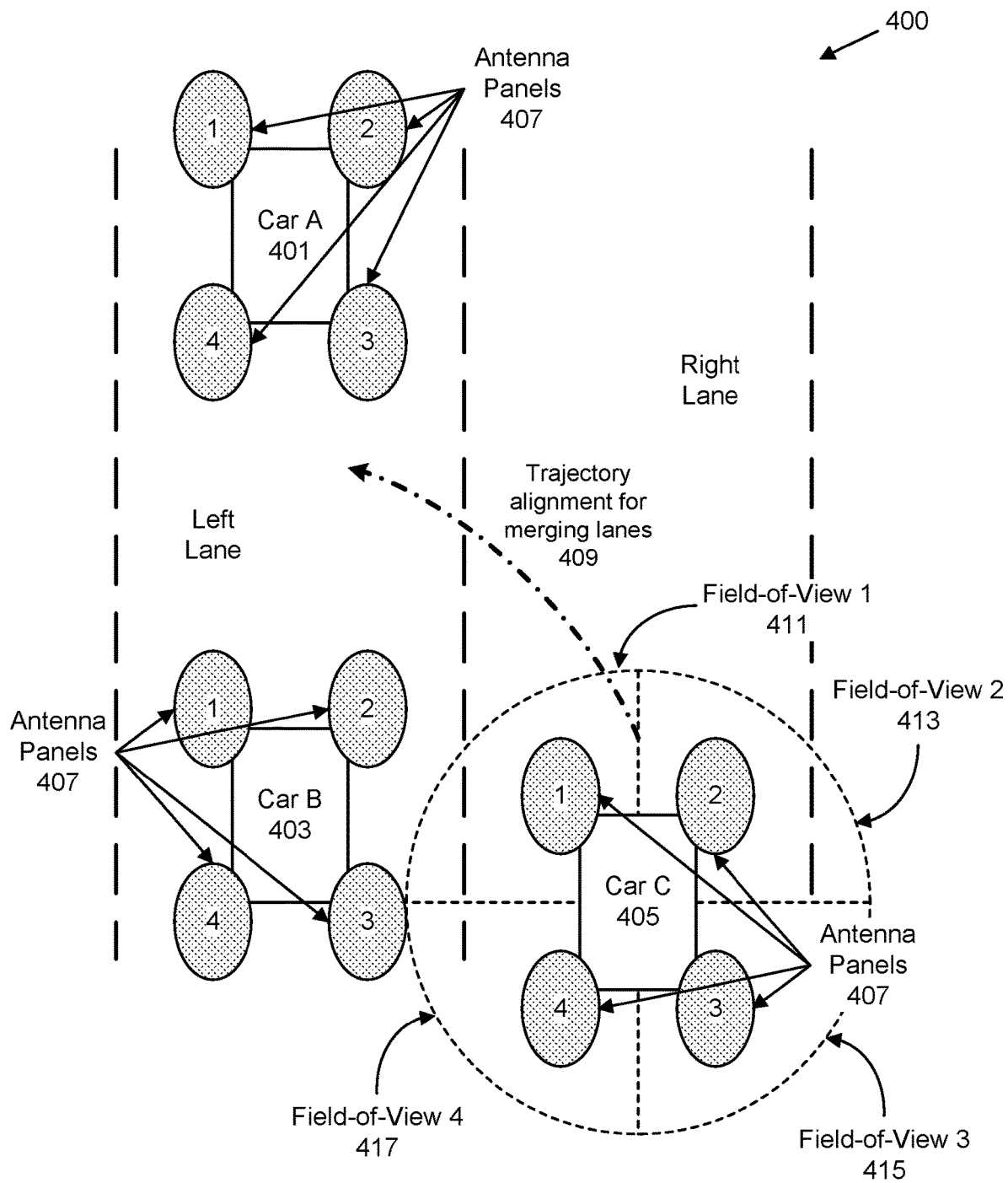
FIG. 4 is a diagram illustrating one embodiment of panel selection for the situation of trajectory alignment among V2X UEs.

FIG. 4 depicts an example of panel selection for the situation 400 of trajectory alignment among V2X UEs, according to embodiments of the disclosure. Lane merging among Car A 401, Car B 403, and Car C 405 (each of which comprises a V2X UE) requires trajectory alignment for merging lanes 409 from e.g., right to left, and happens with the group of cars in one direction. The destination direction of the V2X message (e.g., from Car C 405 to Car B 403 and/or Car A 401) is to be related to the panels in the car.

Panel selection is also necessary for UE-to-UE relaying for activating the correct panels in car for the multi-hop transmission to relay the message in a particular direction. In the depicted embodiment, the V2X UEs each include four UE antenna panels 407, shown at the corners of the cars. In certain embodiments, a Car may support multiple fields-of-view corresponding to the UE antenna panels 407. For ease of illustration, four antenna panels 407 are shown (with indices 1-4); however, the V2X UEs may include more or fewer antenna panels 407. In the depicted embodiment, a first field-of-view 411 corresponds to a first UE antenna panel 407, a second field-of-view 413 corresponds to a second UE antenna panel 407, a third field-of-view 415 corresponds to a third UE antenna panel 407, and a fourth field-of-view 417 corresponds to a fourth UE antenna panel 407.

A "UE antenna panel" may be a logical entity with physical UE antennas mapped to the logical entity. How to map physical UE antennas to the logical entity may be up to UE implementation. Depending on the UE's own implementation, a "UE antenna panel" can have at least one of the following functionalities as an operational role of Unit of antenna group to control its Tx beam independently, Unit of antenna group to control its transmission power independently, Unit of antenna group to control its transmission timing independently. The "UE antenna panel" may be transparent to gNB. An antenna panel may be a transmit antenna panel and/or a receive antenna panel. In various embodiments, a transmit antenna panel has the same field of view as a corresponding receive antenna panel.

For certain condition(s), gNB or network can assume the mapping between UE's physical antennas to the logical entity "UE antenna panel" may not be changed. For example, the condition may include until the next update or report from UE or comprise a duration of time over which the gNB assumes there will be no change to the mapping. A UE may report its UE capability with respect to the "UE antenna panel" to the gNB or network. The UE capability may include at least the number of "UE antenna panels." In one implementation, the UE may support UL transmission from one beam within a panel; with multiple panels, more than one beam (one beam per panel) may be used for UL transmission. In another implementation, more than one beam per panel may be supported/used for UL transmission.

Disclosed herein is a first solution, relating to establishing a unicast beam between a UE-A and a UE-B as part of the initial connection establishment, where the UE-A may be the transmitter UE establishing unicast connection with the UE-B which is a receiver UE. The UE-A may periodically/aperiodically transmit a discovery broadcast message containing L2 source ID, L2 destination ID to find the nearby a SL UE for unicast connection establishment which may be based on PC5 RRC broadcast and/or physical layer discovery mechanism and/or combination of both considering any SL physical layer control and data channels. Unicast link establishment may occur as described above with reference to FIG. 3A, where the UE-A corresponds to UE-A 301 and the UE-B corresponds to any of the UE-B 303, UE-C 305, and UE-D 307.

In the first embodiment, broadcast/groupcast data transmitted by the UE-A may be from different antenna panels/beams in different time (beam sweeping) or same time (multi-beam operation) with different spatial directions. The SL-RS are embedded in the data transmission to aid the receiver channel measurement can be considered and, in another implementation, standalone SL-RS for unicast establishment can be considered and in one method each SL-RS for a UE may be orthogonally generated (e.g., based on sequence and/or cyclic shifts and/or orthogonal cover code) by the UE-A for different antenna panels/beams.

The UE-A, to determine its best transmit ("TX") beam for transmission, may include the panel ID used for transmission in the corresponding spatial directions in the control signaling. The panel ID may be included as an explicit panel-ID or may be included in a SL-RS (e.g., the RS sequence ID may be based on the panel-ID/beam-ID) transmitted by the UE-A. In one implementation of the first solution, the panel ID/SL-RS ID/beam ID is inserted in the SL MAC control element ("CE") header information transmitted by PSSCH or in the SCI field transmitted by PSCCH. In one embodiment, the beam ID may be a RS ID, such as SL-RS ID, SL-CSI-RS ID or SL-SSB ID. In another embodiment, the beam ID may be based on SL-RS ID, SL-CSI-RS or SL-SSB information.

Figure 5:
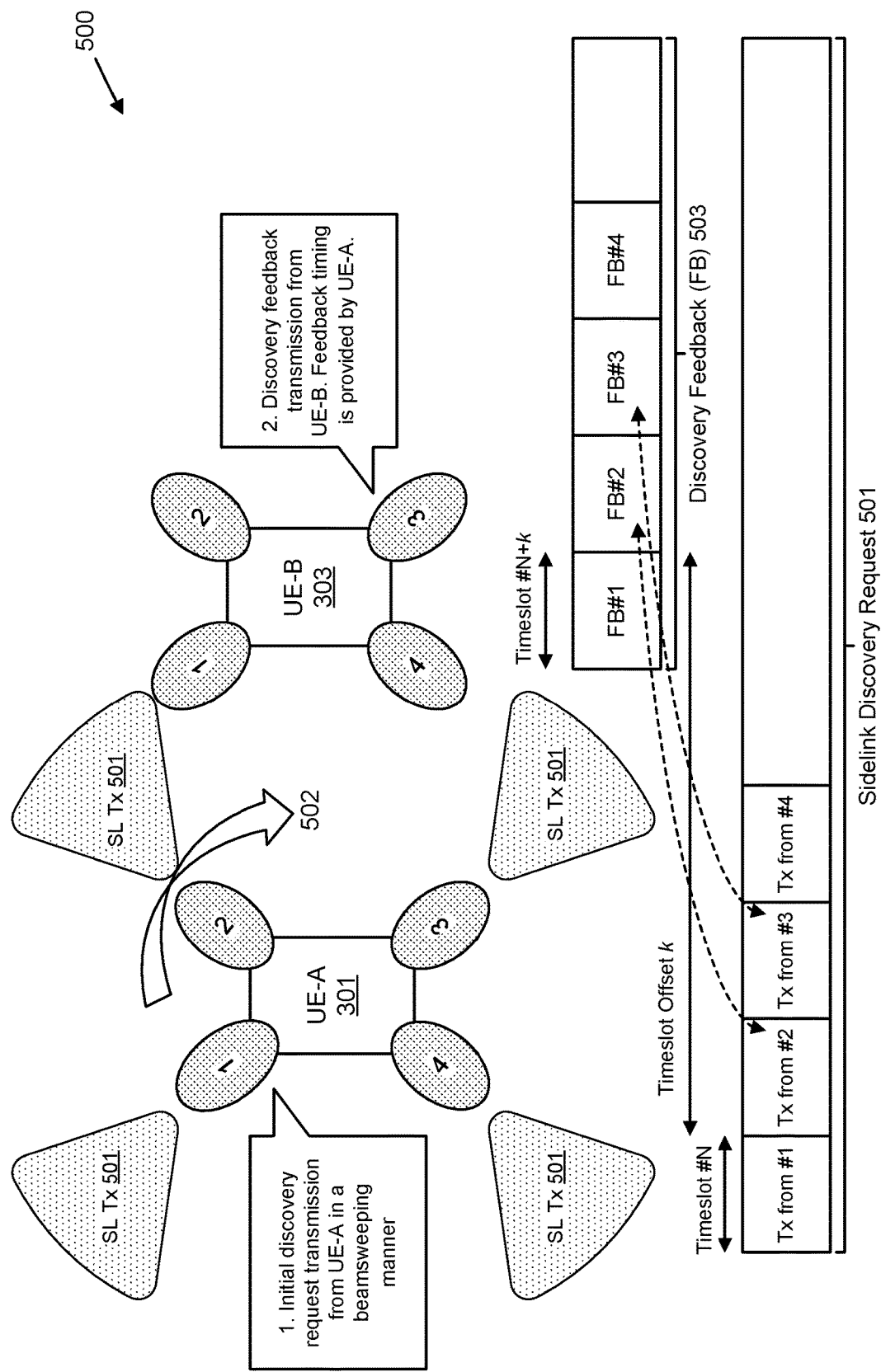
FIG. 5 is a diagram illustrating one embodiment of timing relationship between discovery transmission and reception.

FIG. 5 depicts one example of a timing relationship 500 between a discovery request transmission 501 by the UE-A 301 and discovery feedback transmission 503 by the UE-B 303, according to the first solution. When the UE-A 301 transmits the initial discovery broadcast transmission 501 in a beam sweeping manner 502. For example, to affect the beam sweeping, the UE-A 301 may transmit the discovery request transmission 501 on a first beam (corresponding to a first UE antenna panel) during a first set of transmission symbol duration (e.g., first timeslot), transmit the discovery request transmission 501 on a second beam (e.g., corresponding to a second UE antenna panel) during a second set of transmission symbol duration (e.g., second timeslot), etc. As noted above, the number of symbols per slot/timeslot may be fixed, while the number of slots per radio subframe may vary depending on the radio access technology (i.e., LTE vs NR) and subcarrier spacing. While a specific order of transmission is shown (e.g., specific beam sweeping direction), in other embodiments the antenna panels/beams of UE-A 301 may have different indices and/or the transmission order may differ from that shown.

In certain embodiments, the UE-A 301 indicates the corresponding timeslot and/or timeslot offset (k) for the UE-B 303's feedback transmission so that the UE-A 301 may use the corresponding receive beam/panel to receive the feedback transmission 503 from UE-B 303. This may be the case when the UE-A 301 supports beam correspondence. The UE-B 303 may also use beam sweeping for the feedback message transmission to the UE-A 301 and it transmit the feedback message in the indicated timeslot/timeslot offset (k) provided by UE-A 301 or gNB.

To enable the UE-A 301 to determine the best SL TX antenna panel/beam (recall that the UE-A 301 supports a plurality of beams at a plurality of antenna panel), the feedback message from the UE-B 303 may indicate the UE-A 301's SL panel ID (alternatively, beam ID, SL-RS ID, or SL transmission configuration index), e.g., based on the strongest received L1-RSRP. In such embodiments, the UE-B 303 may choose the receive antenna panel/beam with strongest L1-RSRP for feedback transmission. In some embodiments, the beam IDs may be locally indexed relative to an antenna panel, with spatial separation for beams with the same beam index from different antenna panels achieved by the physical separation/placement of the antenna panels.

The feedback message transmission from UE-B 303 may contain panel ID and/or beam ID and/or SL-RS ID used of transmission/reception. The UE-B 303 may use the transmit power for feedback message transmission based on the received measurement/pathloss from the UE-A 301 discovery transmission 501. In one implementation, the timing relationship between the discovery transmission and reception considering analog beam sweeping from different antenna panel may be either provided in the L1/L2 or L3 signaling of UE-A 301 or gNB. Time/frequency resource may be reserved by the UE-A 301 or gNB for the feedback transmission from the UE-B 303 and may be indicated in the corresponding L1/L2 or L3 signaling of UE-A 301 or gNB. In another implementation, the best panels or beam selection may also be implicitly derived from the fixed timing relationship between the discovery transmission/feedback.

In NR Mode-1, the best SL panel ID (alternatively, best beam ID, best SL-RS ID, or best SL transmission configuration index) for unicast transmission with a particular UE-B 303 may also be informed to the gNB in the UL signaling for scheduling assistance purpose. The transmission configuration may include spatial relation or quasi-collocation assumption between the target transmission by UE-A 301 and reference RS (e.g., SL-RS transmitted by the UE-A 301 discovery transmission, SL-RS transmitted by the UE-B 303 feedback message) and may comprise panel-ID(s) information for UE-A 301 transmission. UE(s) may also include the number of supported UE antenna panels for SL transmission as part of UE capability information; UE may also transmit periodically or periodically the number of active UE antenna panels for SL transmission to gNB.

In NR Mode-2 sensing procedure, the UE-A 301 in the resource exclusion process for the candidate resource selection may exclude this timeslot and/or panel ID/beam ID from scheduling any other UE(s). This limits the UE-A 301 from using the same analog panel/beam with same/different frequency resource in the same timeslot to communicate to other UE(s) in any other direction. However, based on the digital beamforming capability of the UE-A 301, the UE-A 301 may use the same timeslot with same/different frequency resource to communicate with other UE(s) by forming independent beams (e.g., with low cross-beam interference) from the same panel.

A power ramping procedure may also be considered for discovery transmission/reception 501. Here, the UE-A 301 may transmit the initial discovery transmission 501 in a reduced power level (X dBm) based on the range of discovery transmission, where the range is higher layer parameter, which enables the UE-A 301 to find SL UE(s) in its vicinity. If the UE-A 301 does not receive any feedback from the SL UE(s) (e.g., UE-B 303, UE-C 305 and/or UE-D 307), then the UE-A 301 may (re)transmit the discovery message 501 with an increased step of transmit power (step value, Y dB, total transmit power, X+Y dBm) and this power ramping procedure is continued until a certain time period (i.e., timer) expires where the UE-A 301 discontinues or stops the discovery procedure. The same power ramping procedure may also be considered for feedback transmission from the UE-B 303.

A solution for directional transmission includes the following steps: In a first step, the UE-A 301 transmit the broadcast in 360 degree field of view among the total number of Antenna Panels 407, e.g., with some overlap. So, if there are total 4 Antenna Panels 407 as in the depicted embodiment, then the antenna panels 407 each cover 90 degrees each (or a bit more for some overlap between them). This however does not exclude the case where one Antenna Panel 407 covers much more than 90 degrees and other(s) significantly less. The mapping between which Antenna Panel 407 covers which part of the circular 360 deg view is available in the UE and is refer to as the Antenna Panel 407's "field of view" (refer also to FIG. 4).

In the second step, the UE-A 301 determines to which direction a transmission needs to be made; and, after having made this determination the Antenna Panel 407 responsible for that direction will be used for the actual transmission.

In a third step, the above two information is combined and direction is basically calculated by determining the required "field of view" and choosing the corresponding Antenna Panel 407 for the said direction; where, determining the required "field of view" or direction by a device (i.e., UE-A 301) may be accomplished in a number of ways: 1) By noting the received Beam that has the best quality of reception from a receiver UE-B 303, where the receiver UE (B) 303 is the UE to which a transmission needs to be made subsequently by the said device (i.e., UE-A 301); and/or 2) Based on the application layer determining the required "field of view" or direction based on the actual geographical position of the UE-B 303 and the UE-A 301's own location. The location of the UE-B 303 is conveyed to it using one of the V2X application, like Cooperative Awareness Messages ("CAM") (refer to the third solution, below).

In a final step, having determined the required "field of view" or direction of UE-B 303, the UE-A 301 then instructs the physical layer and the radio frequency ("RF") layer to use only the corresponding Panel and/or transmit beam for the said transmission. In order to do so, the MAC entity (i.e., at MAC sublayer 360) performs TB formation keeping in mind the L2 destination ID of the UE-B 303. So, the Logical Channel Prioritization ("LCP") procedure only takes the Logical Channel ("LCH") of destination ID of UE-B 303 into account for the said transmission. In one implementation the Antenna Panel and/or transmit beam used for transmission is informed to MAC entity by the upper layers, and MAC entity further informs the Physical layer 355 and RF layer, subsequently. In another implementation, the UE maintains a mapping of L2/L1 destination IDs and the corresponding Antenna Panel and/or transmit beam to used—this mapping table is updated by the UE as and when the relative position of UE-A 301 and UE-B 303 has changed.

Disclosed herein is a second solution which relates to Unicast switching of a UE antenna panel and/or beam based on measurements. The UE-A 301 may periodically/a-periodically transmit SL-RS both with current activate panel/beam used for SL data transmission and also with other activate panel/beam to enable continuous radio link measurement from different panels. The UE-B 303 (i.e., Rx UE) performs L1-RSRP measurement on each received panel and provide measurement report to the UE-A 301 (i.e., Tx UE) in the SL data or control channel or via higher layer signaling. The UE-A 301 may switch the transmission to different panel and indicate about this in the L1/L2/L3 signaling. In another method, the UE-A 301 may report the L1-RSRP measurement from itself and/or also from the UE-B 303 to gNB and gNB may indicate to switch the panel for transmission/reception for UEs via L1 downlink control information ("DCI") 5A-like signaling.

Disclosed herein is a third solution which relates to SL directional transmission of data and control signaling, where the directionality aids in the Tx panel selection. As the antenna panel/beam for a UE is a limited resource, the distributed scheduling of NR Mode-2 and the centralized scheduling of NR Mode-1 by gNB should take care of limited capability of antenna panel/beam of a UE.

In one embodiment for NR PC5 functionality for groupcast and unicast transmission, the UE AS layer (i.e., RRC/SDAP, PDCP, RLC and MAC sublayers) may be provided with an additional information such as directionality of V2X message transmission as part of service requirement which may be appropriately used to select the corresponding panel for transmission/reception. This directionality information may be directly or indirectly provided to the UE AS layer.

This information may be conveyed to the UE AS layer in many possible ways: 1) V2X application or V2X layer in the UE informs the UE AS layer, part of the QoS flow/range (PQI+range+directionality/position) or context information; 2) V2X application server or V2X control function in the core network may inform the UE either provisioning this information or as part of service type mapping or by positioning; 3) gNB may inform the UE in the L1/L2 or L3 signaling; or combinations thereof.

If the directionality information is not provided, then the AS layer may choose to transmit the message in all direction or a subset of the direction with e.g., no constraints on the beam width or number of beams or spatial domain transmission filters or order or priority of beam transmission with respect to directionality.

In one example, directionality may be defined with respect to current position (e.g., navigation system (e.g., GPS, GNSS) coordinates or positioning system parameters (e.g., based on positioning techniques such as DL RSs (e.g., DL Observed Time Difference Of Arrival ("OTDOA")), based on UL RSs (e.g., UL OTDOA), or combination of the range and angular measurements)) and/or speed/direction of travel of the UE. The directionality may determine the desired boresight angle (azimuth, elevation, or both), and the axis of maximum gain (maximum radiated power) for a (e.g., reference) transmission beam. The range may be conditioned on the indicated directionality, e.g., indicating the minimum distance in the angular direction (e.g., direction of the boresight angle with a certain (e.g., reference) beam width for a (e.g., reference) transmission) beam that the QoS parameters need to be fulfilled.

Based on the directionality parameter, the UE L1/L2 layer may determine the spatial domain transmission filter to use that satisfy the desired directionality and Range characteristics for the transmission. The spatial domain transmission filter may include determining one or more antenna panels/arrays/sub-array from the set of antenna panels/arrays at the UE and the transmit precoding antenna element weights to use. The precoding may be digital precoding or a combination of digital and analog precoding (hybrid precoding). In one example, the UE may determine a reference RS or SL Transmission Configuration Indicator ("SL-TCI") state configuration for spatial relation or quasi-collocation assumption between the target transmission and reference RS. The SL-TCI state may associate one or more reference RS with a corresponding quasi-colocation ("QCL") type which is quasi-collocated with the target transmission. The reference RS may be in the same or different UL bandwidth part ("BWP"), same or different carrier (e.g., supplementary uplink ("SUL") operation or non-SUL operation), same or different serving cell as the target V2X message transmission.

In one example, the reference RS may be a SL-RS transmitted by the source UE (e.g., most recent to the target UE), and the target V2X message transmission is transmitted with the same spatial domain transmission filter used for the transmission of the reference RS. In another example, the reference RS may be a SL-RS transmitted by the destination or target UE (e.g., most recent from the target UE), and the target V2X message transmission is transmitted with the same spatial domain transmission filter used for the reception of the reference RS. The reference RS or SL-TCI may comprise panel-ID(s) information which is used for transmission of the target V2X message transmission. In some examples, the reference RS may be one or more of a SL-RS, Sounding Reference Signal ("SRS"), CSI-RS, synchronization signal, discovery signal, DM-RS for PSSCH (SL shared channel), DM-RS for PSCCH (SL control channel), PSSCH, PSCCH, SL Random Access Channel ("SL-RACH"). The target transmission may include a target RS/channel such as DM-RS for PSSCH, SL Physical Random Access Channel ("SL-PRACH"), DM-RS for PSCCH, CSI-RS, SL-RS, SRS, CSI-RS, synchronization signal, discovery signal.

The directionality information is used by the RAN to map a particular SL MAC TB and/or PSCCH to a certain active TX antenna panel id(s) for transmission which is particularly beneficial for FR2/FR4 mmWave frequencies where multiple antenna panels are mounted. In one example, based on the input on the directionality of the message transmission, one or more V2X UE antenna panel(s) may be activated, and SL control & data transmitted over the activated panels. This method is helpful for partial beam sweeping around active antenna panels for SL control and data channel transmission.

Disclosed herein is a fourth solution which relates to SL directional sensing procedure. As discussed above, a V2X UE excludes other UEs occupied resources by decoding SCI and measuring SL-RSSI/SL-RSRP and comparing with the threshold. In case of V2X UE equipped with multiple distributed antenna panels widely separated and mounted around the vehicle, the measured SL-RSSI/SL-RSRP may be different for different antenna panels.

In this embodiment, the exclusion of resource for measured SL-RSSI should take into account the V2X panel ID, so $S_A$ is created for each antenna panels and $S_B$ that contains the sorted resources according to the minimum SL-RSSI/SL-RSRP values is also created separately for each antenna panel. The MAC layer based on the directionality information from, above embodiment, select the antenna panel and their corresponding resource from $S_B$. If two or more antenna panels are selected for groupcast or unicast transmission, then a resource that contains the smallest SL-RSSI/SL-RSRP may be selected from the multiple $S_B$ resource sets.

In one example, the exclusion of resource is determined for each subset of beams within an antenna panel. A subset of beams may include one or mean beams. Two subsets of beams may include a common beam (e.g., the same beam).

In one example, a first resource is excluded from a first panel based on received signal (e.g., SCI or SL-RS) using a first beam with a first boresight angle. This may result in at least a second resource (e.g., same as first resource) from a second panel using a second beam with a second boresight angle to be excluded from that panel set $S_A$ resources if the (absolute) difference between the first boresight angle and the second boresight angle is 180±δ degrees where δ≤Δ (e.g., Δ=20°. The second resource is excluded even if the second resource is determined to be unoccupied based on decoded SCI and/or measured SL-RSSI/SL-RSRP above the threshold on the second panel or second beam.

In one example, in addition to the boresight angle difference, the measured SL-RSSI/SL-RSRP may need to be above a second threshold than the first threshold used for determining the exclusion for the first resource. The second threshold may be larger than the first threshold to take in to account the antenna panel separability or isolation or additional signal path loss between first antenna panel and second antenna panel. The exclusion of the second resource may help with "hidden node" problem with beam-based sensing.

For example, referring to FIG. 4, a resource excluded from the panel #1 associated with the first of view #1 with beam boresight angle of 135° may not be detected as occupied based on RSRP measurements on panel #3 associated with the first of view #3 with beam boresight angle of −45°, but transmissions from other UE(s) on the first resource (as detected on panel #1) may cause interference to transmission from the panel #3 of the source UE (e.g., Tx UE) to target UE (e.g., Rx UE), such as when the interfering UE, source UE and target UE are approximately collinear spatially (i.e., in the spatial beam directivity sense).

In some of the embodiments mentioned, the UE is capable of Beam correspondence, where beam correspondence means that each Tx port may be beamformed in a desirable direction but does not imply setting phase across ports. The beam correspondence may be fulfilled with need for beam sweeping or without beam sweeping.

Figure 6A:
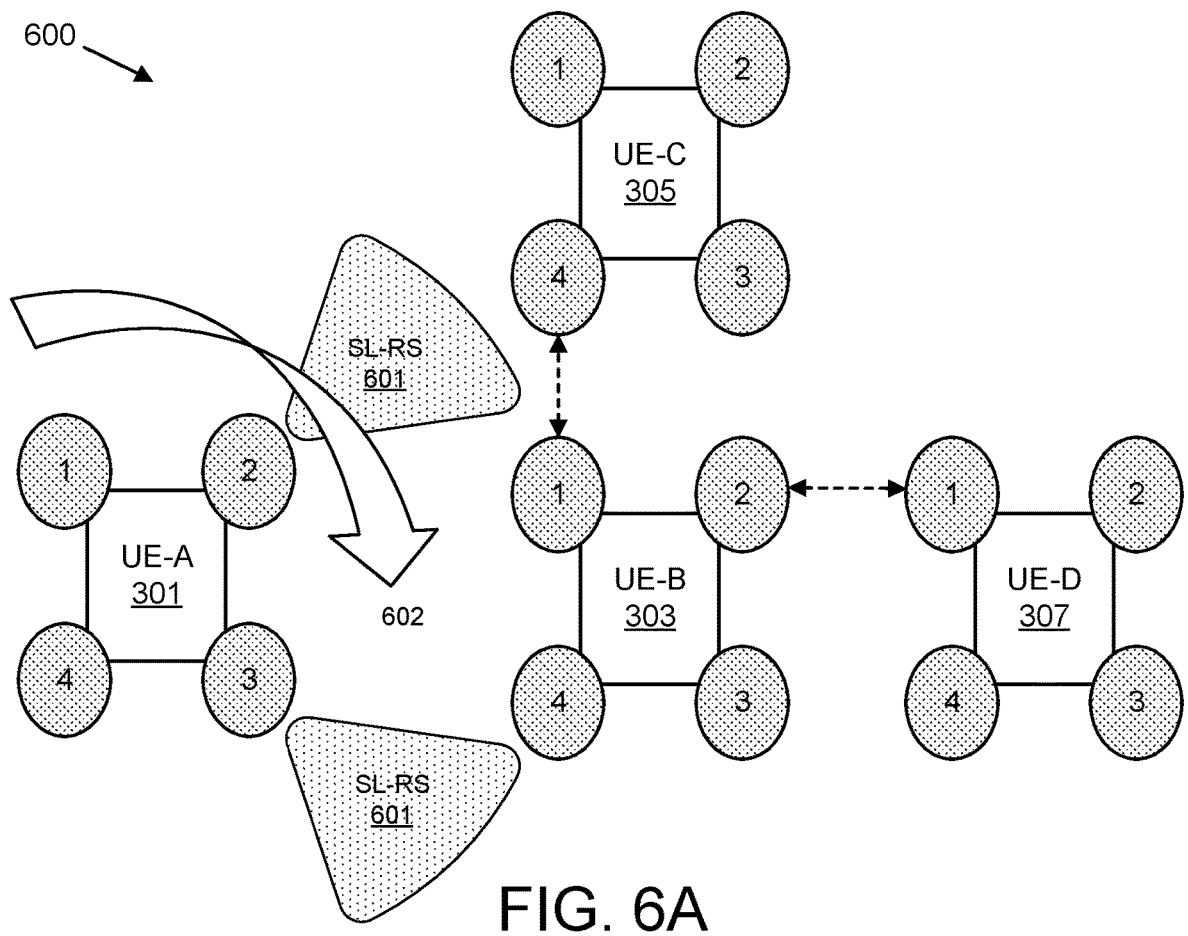
FIG. 6A is a diagram illustrating one embodiment of V2X communication.
Figure 6B:
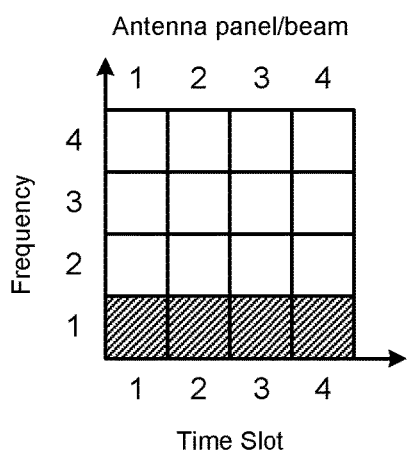
FIG. 6B is a diagram illustrating panel/beam usage by a first V2X.
Figure 6C:
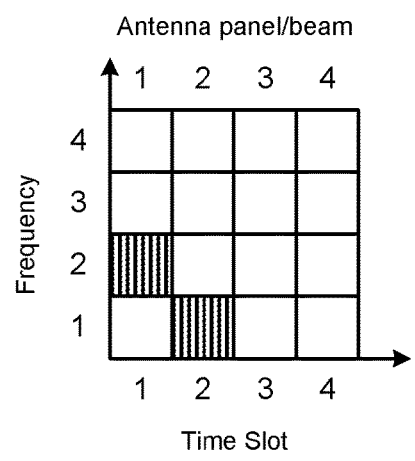
FIG. 6C is a diagram illustrating panel/beam usage by a second V2X.

FIGS. 6A-6C depict an embodiment of panel/beam usage by V2X UEs. FIG. 6A depicts SL communication 600 among a set of V2X UEs, here the UE-A 301, the UE-B 303, the UE-C 305, and the UE-D 307. As depicted, the UE-A 301 performs beam-based SL transmission in a beam-sweeping manner 602. In various embodiments, embedded within the SL transmissions are a SL-RS 601 or another beam ID as discussed above with reference to the first solution.

FIG. 6B depicts a chart of panel/beam usage for the UE-A 301. FIG. 6C depicts a chart of panel/beam usage for the UE-B 303. The usage of panel #2 of UE-B 303 at timeslot #2 with frequency #2 may not be detected with sensing operation by UE-A 301. If the UE-A 301 were to also transmit using the same time and frequency, this might result in interference. Hence, a feedback transmission from UE-B 303 to UE-A 301 may indicate to exclude this frequency from UE-A 301 scheduling and/or to reduce the transmission power. A UE may send information (e.g., either a periodic/aperiodic groupcast or unicast transmission from the UE) about its SL resource usage on each active antenna panel/beam, which may be transmitted from one or more panel/beam to one or more nearby UE(s).

In one example, the source UE-A 301 may indicate one or more potential resource for transmission (e.g., on PSCCH or SL-RS on the potential resource) and the target UE-B 303 may positively acknowledge the resource before the data/message transmission on the resource by the source UE-A 301 (to the target UE-B 303).

Disclosed herein is a fifth solution which relates to orthogonal SL-RS for interference measurement and advanced receiver processing. In one embodiment, the gNB (or scheduling UE ("SUE"), or by UE cooperation) assigns each UE belonging to a certain group or certain MCR with an orthogonal SL-RS for interference measurement or interference cancellation technique. In another method, each panel/beam, or a subset of panel/beams (or a subset of beams within a panel) of a UE is assigned an orthogonal SL-RS.

Referring again to FIG. 6A, the UE-B 303 in panel #2 may measure the SL-RS 601 transmitted from the UE-A 301 by panel #2 and may feedback the interference measurement to the UE-A 301. Based on the measurement, the UE-A 301 may either exclude the resource or reduce the transmission power or cancel interference.

Figure 7:
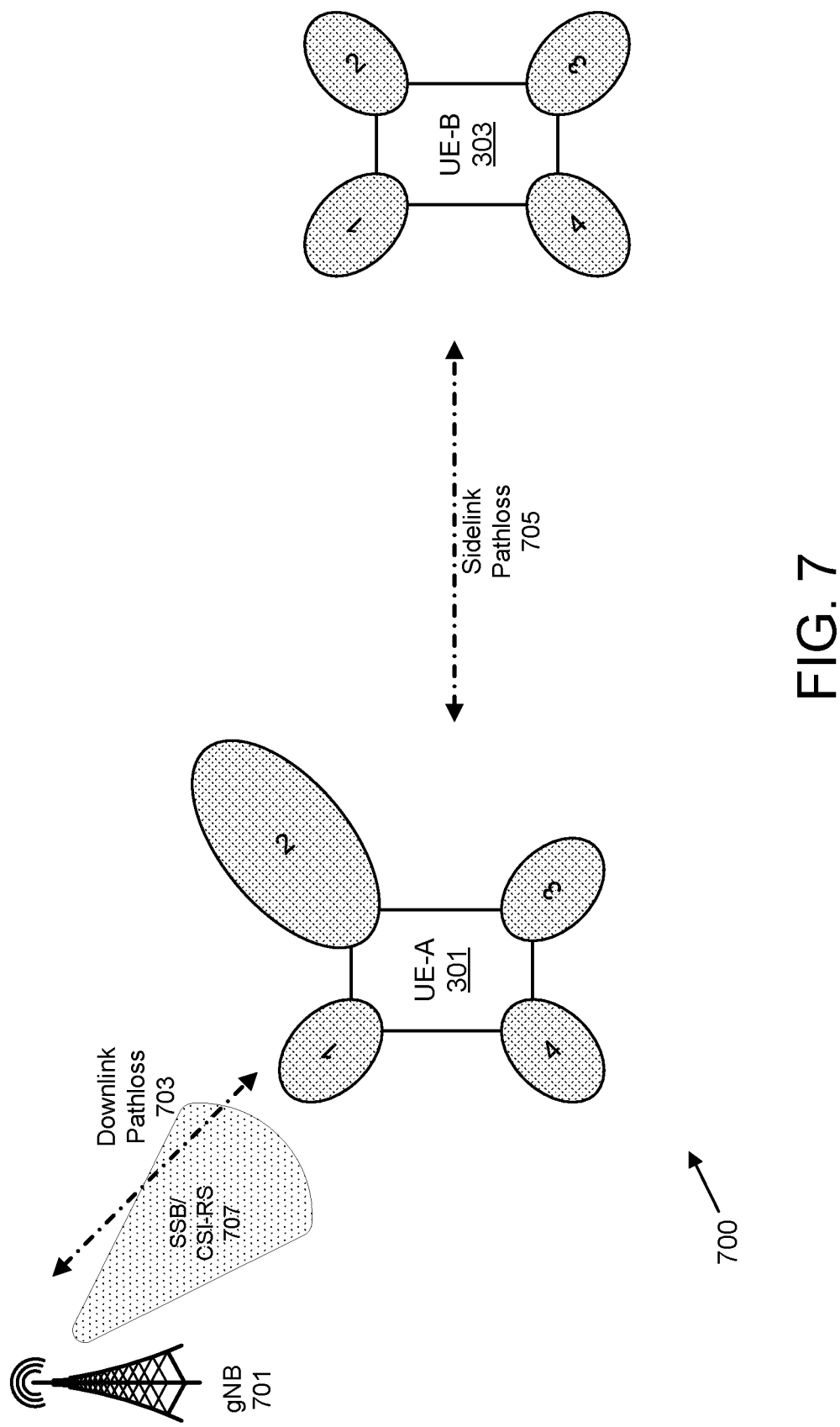
FIG. 7 is a diagram illustrating one embodiment of downlink ("DL") pathloss and SL pathloss.

FIG. 7 depicts DL and SL pathloss in V2X communication 700, according to embodiments of the disclosure. In V2X, to reduce the interference to gNB 701, the DL pathloss 703 is taken into account when determining the SL open loop power control. According to a sixth solution which relates to SL power control, vehicles (i.e., V2X UEs)

equipped with multiple antenna/beam for transmission/reception may use the DL pathloss 703 in certain antenna panels/beam that is facing in the direction of the gNB 701 to calculate the SL open loop power control transmit power for SL transmission. Additionally, the other antenna panels/beam that is facing away from the direction of the gNB need not use the DL pathloss measurement 703 and may use another SL open loop power control (e.g., SL pathloss 705 between Tx UE and Rx UE, different open-loop power control parameters) transmit power for SL transmission.

In some embodiments, the UE may be (pre)configured with a threshold for determination. In one example, the pathloss is estimated for each antenna panel (e.g., based on a suitable receive beam (e.g., maximum RSRP beam across different received pathloss RS/beams, the RS may be from the gNB or from SL UE) from the panel), and the panel-specific DL pathloss estimate is used for determining SL (e.g., open-loop) transmit power for SL transmission from that panel. The open-loop power control parameters (P0 and alpha values) may be separately/independently configured for each pathloss RS. The open-loop power control parameters associated with different DL pathloss RS may be different.

In one implementation, the 'facing in the direction' and 'facing away from the direction' of gNB may be a qualitatively measure of L1-RSRP based on the Synchronization Signal Block ("SSB") or Channel State Information Reference Signal ("CSI-RS") transmission 707 from the gNB 701. If the L1-RSRP measurement of SSB/CSI-RS 707 from an antenna panel/beam is more than a threshold, then it is facing in the direction of the gNB 701. A first antenna panel facing in the direction of the gNB 701 (e.g., antenna panel 1 of UE-B 303) may be used for communication/measurement with the gNB 701 using Uu interface and simultaneously used for Sidelink communication with neighboring UEs, a second antenna panel may be considered facing in the direction of the gNB 701 if it is near to the first panel within a certain boresight angle used for communication/measurement with the gNB 701 using Uu the interface and simultaneously used for SL communication. As discussed above, an antenna panel facing in the direction of gNB 701 may use the DL pathloss 703 to determine the SL transmit power for determining SL transmit power. Measurement means transmitting and reception of RS to and from the gNB 701 using Uu and Communication means transmitting and reception of data to and from the gNB 701 using the Uu interface.

In this case, a SL UE (i.e., UE-A 301 and/or UE-B 303) may use different P0 and alpha values for each antenna panel/beam or panel group/beam group in the same timeslot or different timeslot based on the above assumption. The antenna panel/beam that is facing away from the gNB 701, where there is no communication/measurement performed with the gNB 701 or antenna panel not activated to perform communication/measurement with the gNB 701 and/or third antenna panel are above certain boresight from first and second antenna panels that are communication and/or measurement with the gNB 701 may use different SL open loop power control using SL pathloss between UE-A 301 and UE-B 303, different open-loop power control parameters such as P0 and alpha and the antenna panel/beam that is facing away from the gNB 701 may additionally use the MCR to limit its SL transmit power.

Disclosed herein is a seventh solution, which relates to link adaptation for groupcast transmission, e.g., CSI/CQI reporting based on MCR. For groupcast transmission by a Tx UE, there may be many methods/ways where a MCR may be used for link adaptation or resource selection and/or resource exclusion process, thus expanding on the process discussed above with reference to FIG. 3A.

For Groupcast, the MCR may be used to enable CSI/CQI feedback reporting only for those Rx UE(s) that are inside the MCR range. The benefit is less CSI/CQI reporting from Rx UE(s).

When Rx UE(s) decodes the SCI or MAC-CE transmitted by the Tx UE indicating the Tx UE's current location information/relative location information like zone id and the associate range information, the Rx UE(s) may calculate based on the its own current location/relative location like zone id and the range information, whether the Rx UE(s) is inside the MCR or not and may decide to feedback CSI/CQI values either via PSSCH or PSCCH or Physical Sidelink Feedback Channel ("PSFCH") or by MAC CE signaling. In one method, the Modulation and Coding Scheme ("MCS") for the groupcast transmission may be derived from this method and in another method, candidate resource selection and/or exclusion may be performed.

In an alternative method, the Rx UE may indicate its own location information/relative location information like a zone id either via PSSCH or PSCCH or by MAC-CE signaling along with the CQI/CSI values to a Tx UE. The Tx UE may filter the CQI/CSI reporting values from Rx UE(s) based on the MCR value and may consider CQI/CSI values only inside the MCR range for link adaption and/or candidate resource selection and/or resource exclusion process.

Disclosed herein is an eighth solution, which relates to groupcast feedback. If the Tx UE does not enable SL HARQ feedback in the SCI to the Rx UE(s) while the DCI transmitted to the Tx UE by the gNB enables the SL HARQ feedback and/or also provides the Physical Uplink Control Channel ("PUCCH") feedback timing and resource for reporting SL HARQ feedback status to the gNB, then the Tx UE may transmit Positive Acknowledge ("ACK") in the PUCCH resource to avoid the gNB providing retransmission grant for that HARQ process. As used herein, "HARQ-ACK" refers to HARQ feedback may represent collectively the ACK and the Negative Acknowledge ("NACK"). ACK means that a TB is correctly received while NACK means a TB is erroneously received.

Disclosed herein is a ninth solution, which relates to SL unicast transmission. Referring again to FIG. 3A, for some SL unicast link, a bi-directional data transmission (both UE-A 301 and UE-B 303 may send data to each other) is possible, there may be two different approaches for both NR Mode-1 and NR Mode-2 resource allocation: Option 1—Resource may be scheduled for the UE-B 303's transmission by UE-A 301; and Option 2—Resource for the UE-B 303's transmission may be scheduled by itself. However, there are some problems in using Option 2.

In Mode-2 resource allocation, UE-A 301 does not know when the UE-B 303 is sending the data. In worst case, both may transmit SCI in the same timeslot and cannot hear each other. In another problem, the UE-B 303 may be partial or out of cell coverage and may use different resource allocation mode scheme compared to UE-A 301. Such cases may degrade the application performance and/or causes collision by transmitting SCI at the same time.

To solve the above, in one embodiment, the UE-B 303 may inform the UE-A 301 and/or the gNB 701 may also be informed either by the UE-A 301 or UE-B 303 about the UE-B 303's NR Mode-2 transmission and/or reserved resources and/or timeslot to avoid collision or half duplex issues so that the UE-A 301 or the gNB 701 may exclude in its scheduling the indicated timeslot or resources.

In this embodiment the option 1 procedure is described: The UE-A 301 may schedule the UE-B 303's transmission for SL unicast transmission otherwise both UE-A 301 and UE-B 303 for the SL unicast should use the same NR mode for resource allocation scheme which may be that of the UE-A 301. In case the UE-B 303 is out of coverage, the UE-A 301 in NR Mode-1 may also transmit the Sidelink Buffer Status Report ("SL-BSR") for the UE-B 303's transmission separately and/or along with its own SL-BSR to the gNB 701 for scheduling assistance purpose.

In NR Mode-2, the UE-A 301 may reserve the transmission resource for UE-B 303's transmission to avoid resource collision and/or half duplex issues and signal reserved resource for UE-B 303's transmission in the L1 signaling like SCI. The UE-B 303 may also transmit its message arrival rate, Semi-Persistent Scheduling ("SPS") periodicity, and/or SL-BSR to the UE-A 301 as part of initial PC5 RRC signaling exchange and after that periodically/aperiodically for any changes in the buffer so that it may assist in the scheduling for both Mode-1 and Mode-2.

In case of radio link failure ("RLF") between the UE-A 301 and the gNB 701 while the UE-B 303 is in the good coverage and has good link to the gNB 701, the Option 1 role may be reversed or interchanged where the UE-B 303 may become the scheduler for the UE-A 301, which may be implicitly or explicitly signaled to the gNB 701 or the UE-A 301.

Disclosed herein is a tenth solution, which relates to Pedestrian UE ("PUE") sensing mechanism. Note that a PUE is usually power limited and normally uses random resource selection or partial sensing by decoding SCI in one or more slots to find the candidate resource for transmission. According to the tenth solution, to improve the reliability of the transmission by PUE, V2X UE, or Road-Side Unit ("RSU") shares the sensing results in a resource pool (which is used by the PUE) which is the resource occupancy by all UE(s) based on SCI decoding and/or L1-RSRP with PUE either periodically or aperiodically with explicit request from PUE to V2X UE or RSU. Since sensing results of resource occupancy in a resource pool is based on geo-location of the UE, the explicitly request indicates the geolocation of the PUE or zone ID and the V2X UE or RSU within a certain MCR shares the sensing results of resource occupancy in a resource pool with PUE and PUE may perform random selection or Listen-Before-Talk ("LBT") or partial sensing by decoding SCI in one or more slots to find the candidate resources for transmission.

Figure 8:
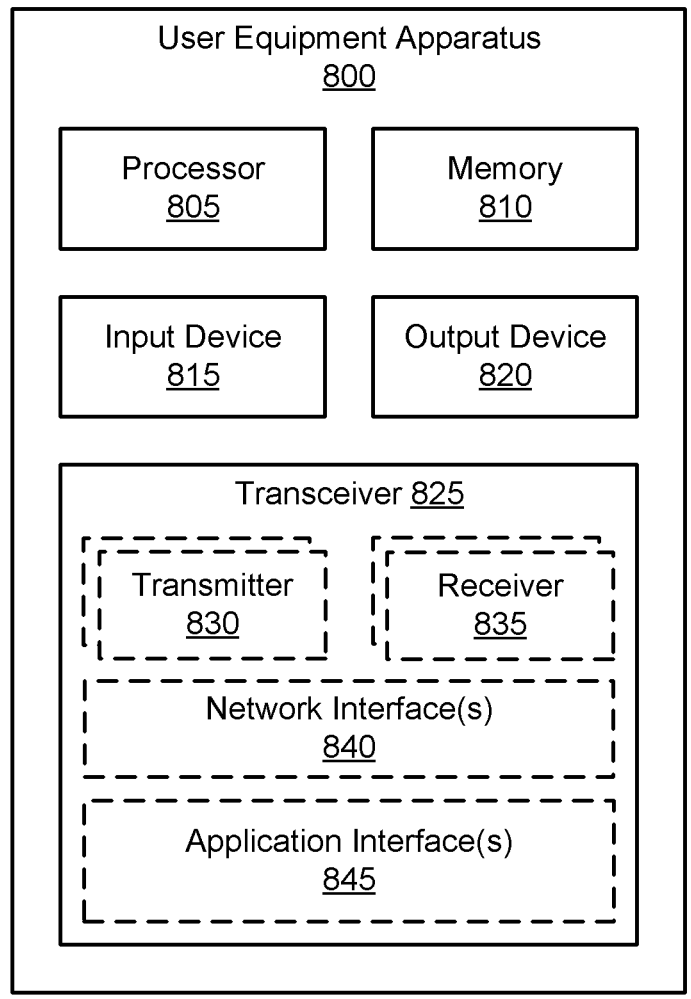
FIG. 8 is a diagram illustrating one embodiment of a user equipment apparatus that may be used for directional transmission/reception of groupcast and unicast communication.

FIG. 8 depicts a user equipment apparatus 800 that may be used for directional transmission/reception of groupcast and unicast communication, according to embodiments of the disclosure. In various embodiments, the user equipment apparatus 800 is used to implement one or more of the solutions described above. The user equipment apparatus 800 may be one embodiment of the remote unit 105 and/or any of the V2X UEs (e.g., UE-A 301, UE-B 303, UE-C 305 and/or UE-D 307, described above. Furthermore, the user equipment apparatus 800 may include a processor 805, a memory 810, an input device 815, an output device 820, and a transceiver 825. In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more V2X remote units 105 and/or with one or more base units 121. Additionally, the transceiver 825 may support at least one network interface 840 and/or application interface 845. The application interface(s) 845 may support one or more APIs. The network interface(s) 840 may support 3GPP reference points, such as Uu and PC5. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user equipment apparatus 800 to implement the above described UE behaviors. For example, via the transceiver 825, the processor 805 performs a plurality of SL transmissions with different spatial directions. Here, each of the plurality of transmissions from one of a plurality of antenna panels, where the SL transmission contain an embedded SL-RS.

In some embodiments, transmitting using SL communications comprises transmitting SL data. Here, the processor 805 embeds the SL-RS is embedded in the SL data transmission. In some embodiments, transmitting using SL communications comprises transmitting SL control signaling. Here, the processor 805 embeds the SL-RS in the SL control signaling.

The processor 805 receives (i.e., via the transceiver 825) a feedback transmission from a receiving UE. The processor 805 that determines a best antenna panel for SL transmission based on the received feedback transmission. In some embodiments, performing the SL transmissions comprises transmitting each of the plurality of transmissions from one of a plurality of antenna panels in different timeslots using beam sweeping. In other embodiments, performing the SL transmissions comprises transmitting each of the plurality of transmissions from one of a plurality of antenna panels in a same timeslot using multi-beam operation.

In some embodiments, the processor 805 embeds a panel ID in each transmission having a different spatial direction. In certain embodiments, each transmission having a different spatial direction contains a SL-RS. In such embodiments, the processor 805 embeds the panel ID within the SL-RS. In certain embodiments, the processor 805 inserts the panel ID in a control element header. In certain embodiments, the processor 805 inserts the panel ID in SL control information corresponding to a SL data transmission.

In some embodiments, the SL-RS for a particular antenna panel is orthogonal to the other SL-RSs. In some embodiments, the feedback transmission indicates a particular antenna panel. In such embodiments, the indication of the particular antenna panel comprises at least one of: a panel ID, a beam ID, and a SL-RS ID.

In some embodiments, the transceiver 825 further transmits a SL discovery broadcast using beam sweeping. Here, the SL discovery broadcast transmission indicates a corresponding timeslot for the feedback transmission. In such embodiments, the determination of the best antenna panel for SL transmission is based on a timing relationship between the SL discovery broadcast transmission and the feedback transmission.

In various embodiments, the processor 805 identifies a set of candidate SL resources. The processor 805 measures signal strength using a plurality of beams at a plurality of antenna panels. The processor 805 excludes at least one SL resource from the set of candidate SL resources, where the exclusion is on a per-antenna-panel basis. In some embodiments, the exclusion of at least one SL resource is determined for each subset of beams within an antenna panel, each subset of beams including one or more beams.

In some embodiments, the processor 805 excludes the at least one SL resource by excluding a first resource from a first panel based on receiving a particular signal using a first beam with a first boresight angle. In certain embodiments, the particular signal includes one of: SL control information and a SL-RS. In some embodiments, the processor 805 excludes a second resource from a second panel using a second beam with a second boresight angle in response to a difference between the first boresight angle and the second boresight angle being less than a threshold angle.

In certain embodiments, the processor 805 excludes the at least one SL resource by excluding a particular resource in response to sensing more than a first threshold amount of signal strength. In such embodiments, the processor 805 excludes the second resource in response to sensing more than a second threshold amount of signal strength using the second beam, where the second threshold is larger than the first threshold. The processor 805 selects a SL resource from the remaining candidate SL resources for performing SL communication using a beam at an antenna panel.

In various embodiments, the processor 805 identifies a DL pathloss between the user equipment apparatus 800 and a RAN node (i.e., base unit or gNB). The processor 805 identifies at least one first antenna panel facing the RAN node and simultaneously used for SL communication. In some embodiments, the at least one first antenna panel facing the RAN node is defined as: 1) an antenna panel used for SL communication and simultaneously used for communication/measurement with the RAN node, e.g., using the Uu interface; or 2) a second antenna panel near to the first panel within a certain boresight angle used for SL communication and simultaneously used for communication/measurement with the RAN node, e.g., using the Uu interface. Here, measurement means transmitting and reception of RS to and from gNB using Uu. Further, communication means transmitting and reception of data to and from gNB using Uu. In some embodiments, an antenna panel is identified as facing the RAN node if a measured signal strength exceeds a threshold amount.

The processor 805 reduces a SL power for the at least one first antenna panel based on the DL pathloss, while ignoring the DL pathloss for SL power control for one or more remaining antenna panels used for SL communication. In some embodiments, the one or more remaining antenna panels are defined as: 1) an antenna panel where there is no communication/measurement performed with gNB; and/or 2) an antenna panel are above certain boresight from an antenna panel facing the RAN node, as mentioned above.

In some embodiments, the processor estimates a pathloss for each of the plurality of antenna panels, where an open loop power control for the at least one antenna panel facing the base unit is based on the DL pathloss and where an open loop power control for the remaining antenna panels is based on a SL pathloss. In certain embodiments, open-loop power control parameters of P0 and alpha ("α") are separately configured for each of the plurality of antenna panels based on the configuration of DL pathloss and/or SL pathloss.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to V2X communication. For example, the memory 810 may store LCH data, MAC PDUs, TBs, LCP results, MCR, and the like. In certain embodiments, the memory 810 also stores program code and related data, such as an operating system or other controller algorithms operating on the remote unit 105.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. The transceiver 825 may be used to provide UL communication signals to a base unit 121 and to receive DL communication signals from the base unit 121, as described herein. Similarly, the transceiver 825 may be used to transmit and receive SL signals (e.g., V2X communication), as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
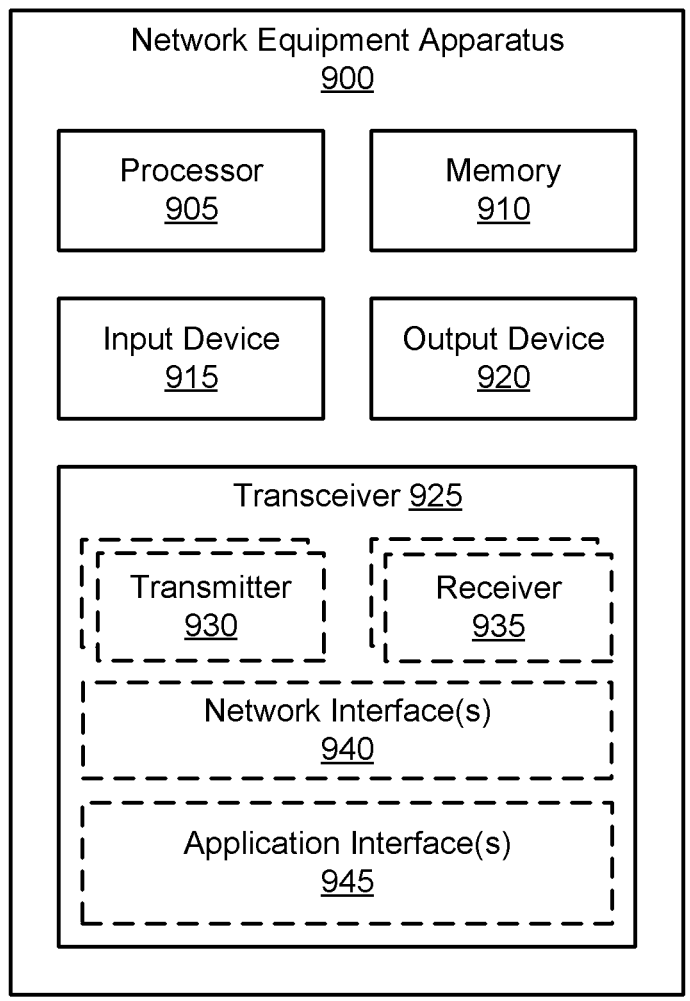
FIG. 9 is a diagram illustrating one embodiment of a network equipment apparatus that may be used for directional transmission/reception of groupcast and unicast communication.

FIG. 9 depicts one embodiment of a network equipment apparatus 900 that may be used for directional transmission/reception of groupcast and unicast communication, according to embodiments of the disclosure. In some embodiments, the network apparatus 900 may be one embodiment of a RAN node and its supporting hardware, such as the base unit 121 and/or gNB, described above. Furthermore, network equipment apparatus 900 may include a processor 905, a memory 910, an input device 915, an output device 920, and a transceiver 925. In certain embodiments, the network equipment apparatus 900 does not include any input device 915 and/or output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the processor 905 controls the network equipment apparatus 900 to implement the above described RAN node behaviors. For example, the processor 905 may coordinate V2X Mode-1 (e.g., NR network-scheduled V2X communication mode) and/or V2X Mode-3 (e.g., LTE network-scheduled V2X communication mode).

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media. In some embodiments, the memory 910 stores data relating to V2X communication, for example storing UE identities, resource configurations, resource grants, and the like. In certain embodiments, the memory 910 also stores program code and related data, such as an operating system ("OS") or other controller algorithms operating on the network equipment apparatus 900 and one or more software applications.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, may include any known electronically controllable display or display device. The output device 920 may be designed to output visual, audible, and/or haptic signals. In some embodiments, the output device 920 includes an electronic display capable of outputting visual data to a user. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, all or portions of the output device 920 may be located near the input device 915.

As discussed above, the transceiver 925 may communicate with one or more remote units and/or with one or more interworking functions that provide access to one or more PLMNs. The transceiver 925 may also communicate with one or more network functions (e.g., in the mobile core network 140). The transceiver 925 operates under the control of the processor 905 to transmit messages, data, and other signals and also to receive messages, data, and other signals. For example, the processor 905 may selectively activate the transceiver (or portions thereof) at particular times in order to send and receive messages.

The transceiver 925 may include one or more transmitters 930 and one or more receivers 935. In certain embodiments, the one or more transmitters 930 and/or the one or more receivers 935 may share transceiver hardware and/or circuitry. For example, the one or more transmitters 930 and/or the one or more receivers 935 may share antenna(s), antenna tuner(s), amplifier(s), filter(s), oscillator(s), mixer(s), modulator/demodulator(s), power supply, and the like. In one embodiment, the transceiver 925 implements multiple logical transceivers using different communication protocols or protocol stacks, while using common physical hardware.

Figure 10:
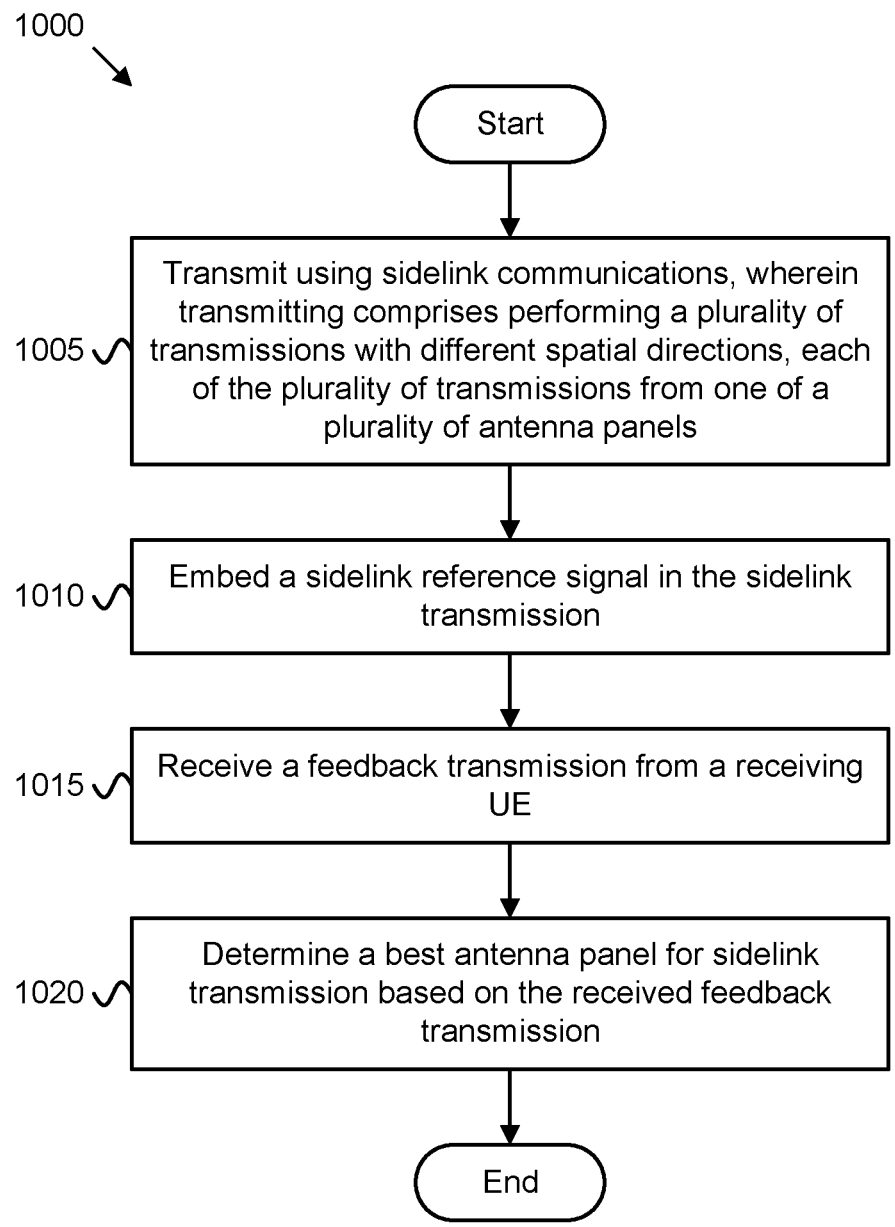
FIG. 10 is a flowchart diagram illustrating one embodiment of a first method that may be used directional transmission/reception of groupcast and unicast communication.

FIG. 10 depicts one embodiment of a method 1000 for directional transmission/reception of groupcast and unicast communication, according to embodiments of the disclosure. In various embodiments, the method 1000 is performed by a UE, such as the remote unit 105, the user equipment apparatus 800, and/or any of the V2X UEs (e.g., UE-A 301, UE-B 303, UE-C 305 and/or UE-D 307, described above. In some embodiments, the method 1000 is performed by a processor, such as a microcontroller, a microprocessor, a CPU, a GPU, an auxiliary processing unit, a FPGA, or the like.

The method 1000 begins and includes 1005 transmitting using SL communications. Here, transmitting comprises performing a plurality of transmissions with different spatial directions, each of the plurality of transmissions from one of a plurality of antenna panels. The method 1000 includes embedding 1010 a SL-RS in the SL transmission. The method 1000 includes receiving 1015 a feedback transmission from a receiving UE. The method 1000 includes determining 1020 a best antenna panel for SL transmission based on the received feedback transmission. The method 1000 ends.

Figure 11:
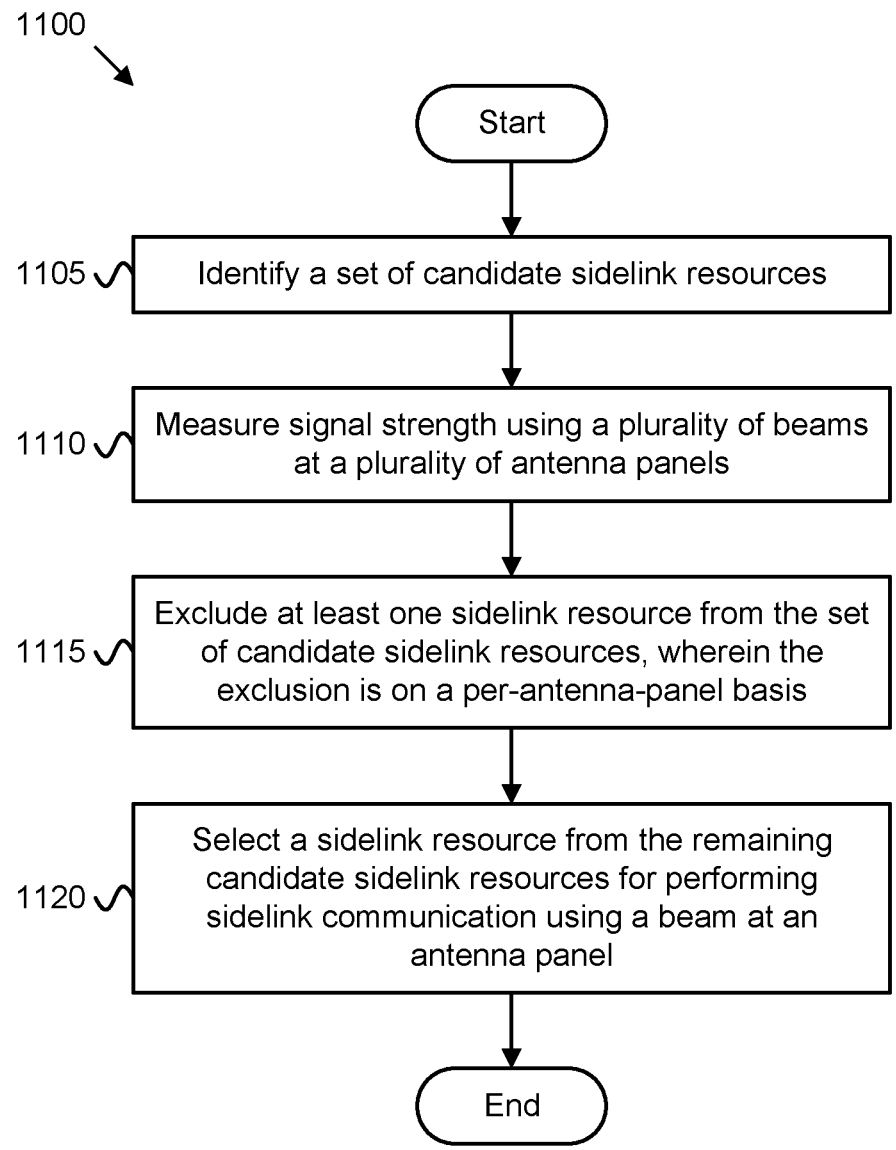
FIG. 11 is a flowchart diagram illustrating one embodiment of a second method that may be used directional transmission/reception of groupcast and unicast communication.

FIG. 11 depicts one embodiment of a method 1100 for directional transmission/reception of groupcast and unicast communication, according to embodiments of the disclosure. In various embodiments, the method 1100 is performed by a UE, such as the remote unit 105, the user equipment apparatus 800, and/or any of the V2X UEs (e.g., UE-A 301, UE-B 303, UE-C 305 and/or UE-D 307, described above. In some embodiments, the method 1100 is performed by a processor, such as a microcontroller, a microprocessor, a CPU, a GPU, an auxiliary processing unit, a FPGA, or the like.

The method 1100 begins and identifies 1105 a set of candidate SL resources. The method 1100 includes measuring 1110 signal strength using a plurality of beams at a plurality of antenna panels. The method 1100 includes excluding 1115 at least one SL resource from the set of candidate SL resources, where the exclusion is on a per-antenna-panel basis. The method 1100 includes selecting 1120 a SL resource from the remaining candidate SL resources for performing SL communication using a beam at an antenna panel. The method 1100 ends.

Figure 12:
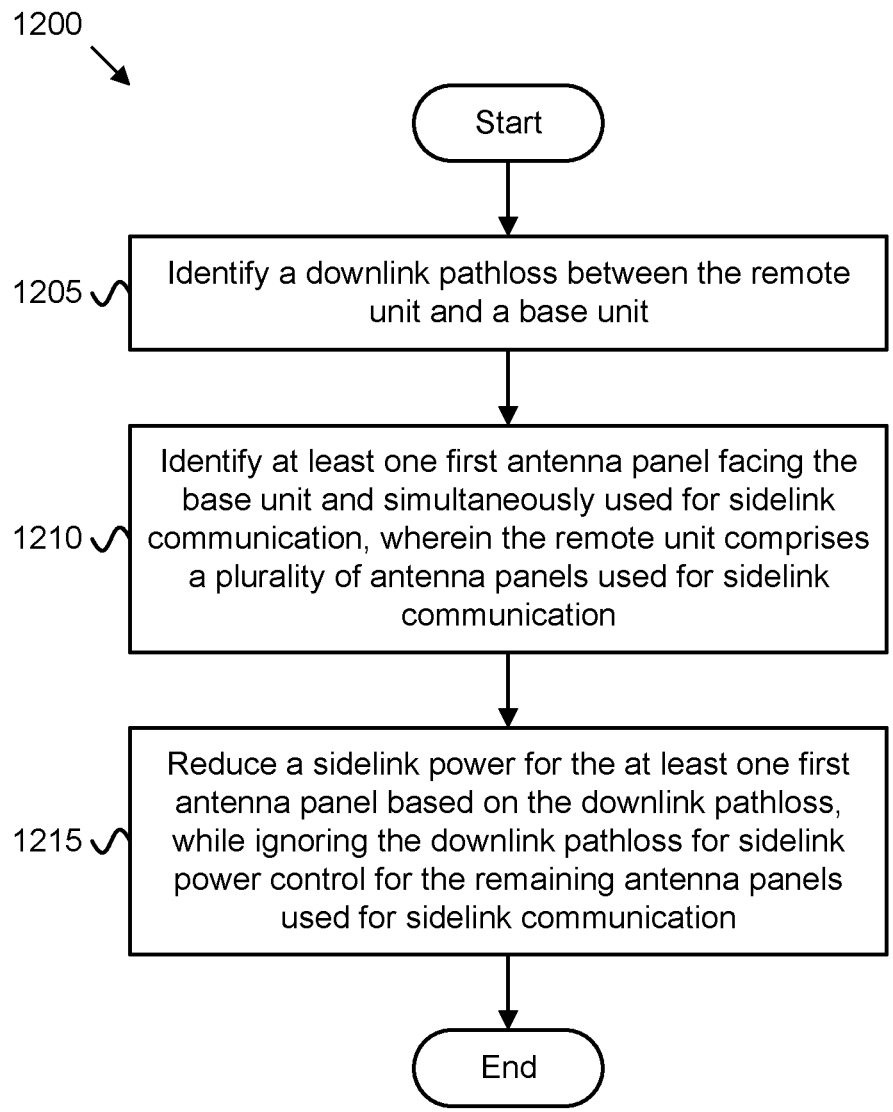
FIG. 12 is a flowchart diagram illustrating one embodiment of a third method that may be used directional transmission/reception of groupcast and unicast communication.

FIG. 12 depicts one embodiment of a method 1200 for directional transmission/reception of groupcast and unicast communication, according to embodiments of the disclosure. In various embodiments, the method 1200 is performed by a UE, such as the remote unit 105, the user equipment apparatus 800, and/or any of the V2X UEs (e.g., UE-A 301, UE-B 303, UE-C 305 and/or UE-D 307, described above. In some embodiments, the method 1200 is performed by a processor, such as a microcontroller, a microprocessor, a CPU, a GPU, an auxiliary processing unit, a FPGA, or the like.

The method 1200 begins and identifies 1205 a DL pathloss between the UE and a RAN node. The method 1200 includes identifying 1210 at least one first antenna panel facing the RAN node and simultaneously used for SL communication. Here, the UE includes a plurality of antenna panels used for SL communication. The method 1200 includes reducing 1215 a SL power for the at least one first antenna panel based on the DL pathloss, while ignoring the DL pathloss for SL power control for the remaining antenna panels used for SL communication. The method 1200 ends.

Disclosed herein is a first apparatus for directional transmission/reception of groupcast and unicast communication, according to embodiments of the disclosure. The first apparatus may be implemented by a UE, such as the remote unit 105, the user equipment apparatus 800, and/or any of the V2X UEs (e.g., UE-A 301, UE-B 303, UE-C 305 and/or UE-D 307. The first apparatus includes a transceiver that performs a plurality of SL transmissions with different spatial directions and receives a feedback transmission from a receiving UE. Here, each of the plurality of transmissions from one of a plurality of antenna panels, where the SL transmission contain an embedded SL-RS. The first apparatus includes a processor that determines a best antenna panel for SL transmission based on the received feedback transmission.

In some embodiments, performing the SL transmissions comprises transmitting each of the plurality of transmissions from one of a plurality of antenna panels in different timeslots using beam sweeping. In other embodiments, performing the SL transmissions comprises transmitting each of the plurality of transmissions from one of a plurality of antenna panels in a same timeslot using multi-beam operation.

In some embodiments, transmitting using SL communications comprises transmitting SL data. Here, the processor embeds the SL-RS is embedded in the SL data transmission. In some embodiments, transmitting using SL communications comprises transmitting SL control signaling. Here, the processor embeds the SL-RS in the SL control signaling.

In some embodiments, the processor embeds a panel ID in each transmission having a different spatial direction. In certain embodiments, each transmission having a different spatial direction contains a SL-RS. In such embodiments, the processor embeds the panel ID within the SL-RS. In certain embodiments, the processor inserts the panel ID in a control element header. In certain embodiments, the processor inserts the panel ID in SL control information corresponding to a SL data transmission.

In some embodiments, the SL-RS for a particular antenna panel is orthogonal to the other SL-RSs. In some embodiments, the feedback transmission indicates a particular antenna panel. In such embodiments, the indication of the particular antenna panel comprises at least one of: a panel ID, a beam ID, and a SL-RS ID.

In some embodiments, the transceiver further transmits a SL discovery broadcast using beam sweeping. Here, the SL discovery broadcast transmission indicates a corresponding timeslot for the feedback transmission. In such embodiments, the determination of the best antenna panel for SL transmission is based on a timing relationship between the SL discovery broadcast transmission and the feedback transmission.

Disclosed herein is a first method for directional transmission/reception of groupcast and unicast communication, according to embodiments of the disclosure. The first method may be performed by a UE, such as the remote unit 105, the user equipment apparatus 800, and/or any of the V2X UEs (e.g., UE-A 301, UE-B 303, UE-C 305 and/or UE-D 307. The first method includes transmitting using SL communications. Here, transmitting comprises performing a plurality of transmissions with different spatial directions, each of the plurality of transmissions from one of a plurality of antenna panels. The first method includes embedding a SL-RS in the SL transmission and receiving a feedback transmission from a receiving UE. The first method includes determining a best antenna panel for SL transmission based on the received feedback transmission.

In some embodiments, transmitting using SL communications comprises transmitting each of the plurality of transmissions from one of a plurality of antenna panels in different timeslot using beam sweeping. In other embodiments, transmitting using SL communications comprises transmitting each of the plurality of transmissions from one of a plurality of antenna panels in the same timeslot using multi-beam operation.

In some embodiments, transmitting using SL communications comprises transmitting SL data. Here, the SL-RS is embedded in the SL data transmission. In some embodiments, transmitting using SL communications comprises transmitting SL control signaling. Here, the SL-RS is embedded in the SL control signaling.

In some embodiments, the first method includes embedding a panel ID in each transmission having a different spatial direction. In certain embodiments, each transmission having a different spatial direction contains a SL-RS. In such embodiments, embedding the panel ID comprises embedding the panel ID within the SL-RS. In certain embodiments, the panel ID is inserted in a control element header. In certain embodiments, the panel ID is inserted in SL control information corresponding to a SL data transmission.

In some embodiments, the SL-RS for a particular antenna panel is orthogonal to the other SL-RSs. In some embodiments, the feedback transmission indicates a particular antenna panel. In such embodiments, the indication of the particular antenna panel comprises at least one of: a panel ID, a beam ID, and a SL-RS ID.

In some embodiments, the first method includes transmitting a SL discovery broadcast using beam sweeping. Here, the SL discovery broadcast transmission indicates a corresponding timeslot for the feedback transmission. In such embodiments, the determination of the best antenna panel for SL transmission is based on a timing relationship between the SL discovery broadcast transmission and the feedback transmission.

Disclosed herein is a second apparatus for directional transmission/reception of groupcast and unicast communication, according to embodiments of the disclosure. The second apparatus may be implemented by a UE, such as the remote unit 105, the user equipment apparatus 800, and/or any of the V2X UEs (e.g., UE-A 301, UE-B 303, UE-C 305 and/or UE-D 307. The second apparatus includes a plurality of antenna panels used for SL communication and a processor that identifies a set of candidate SL resources. The processor measures signal strength using a plurality of beams at a plurality of antenna panels and excludes at least one SL resource from the set of candidate SL resources, where the exclusion is on a per-antenna-panel basis. The processor selects a SL resource from the remaining candidate SL resources for performing SL communication using a beam at an antenna panel.

In some embodiments, the exclusion of at least one SL resource is determined for each subset of beams within an antenna panel, each subset of beams including one or more beams. In some embodiments, the processor excludes the at least one SL resource by excluding a first resource from a first panel based on receiving a particular signal using a first beam with a first boresight angle. In certain embodiments, the particular signal includes one of: SCI or a Sidelink Reference Signal ("SL-RS").

In some embodiments, the processor excludes a second resource from a second panel using a second beam with a second boresight angle in response to a difference between the first boresight angle and the second boresight angle being less than a threshold angle. In certain embodiments, the processor excludes the at least one SL resource by excluding a particular resource in response to sensing more than a first threshold amount of signal strength. In such embodiments, the processor excludes the second resource in response to sensing more than a second threshold amount of signal strength using the second beam, where the second threshold is larger than the first threshold.

Disclosed herein is a second method for directional transmission/reception of groupcast and unicast communication, according to embodiments of the disclosure. The second method may be performed by a UE, such as the remote unit 105, the user equipment apparatus 800, and/or any of the V2X UEs (e.g., UE-A 301, UE-B 303, UE-C 305 and/or UE-D 307. The second method includes identifying a set of candidate SL resources and measuring signal strength using a plurality of beams at a plurality of antenna panels. The second method includes excluding at least one SL resource from the set of candidate SL resources, where the exclusion is on a per-antenna-panel basis. The second method includes selecting a SL resource from the remaining candidate SL resources for performing SL communication using a beam at an antenna panel.

In some embodiments, the exclusion of at least one SL resource is determined for each subset of beams within an antenna panel, each subset of beams including one or more beams. In some embodiments, the exclusion of at least one SL resource includes excluding a first resource from a first panel based on receiving a particular signal using a first beam with a first boresight angle. In certain embodiments, the particular signal includes one of: SL control information and a SL-RS.

In some embodiments, the second method includes excluding a second resource from a second panel using a second beam with a second boresight angle in response to a difference between the first boresight angle and the second boresight angle being less than a threshold angle. In certain embodiments, excluding at least one SL resource from the set of candidate SL resources may include excluding a particular resource in response to sensing more than a first threshold amount of signal strength. In such embodiments, the exclusion of the second resource is further in response to sensing more than a second threshold amount of signal strength using the second beam, where the second threshold is larger than the first threshold.

Disclosed herein is a third apparatus for directional transmission/reception of groupcast and unicast communication, according to embodiments of the disclosure. The third apparatus may be implemented by a UE, such as the remote unit 105, the user equipment apparatus 800, and/or any of the V2X UEs (e.g., UE-A 301, UE-B 303, UE-C 305 and/or UE-D 307. The third apparatus includes a plurality of antenna panels used for SL communication and a processor that identifies a DL pathloss between the apparatus and a RAN node (i.e., base unit or gNB). The processor identifies at least one first antenna panel facing the RAN node and simultaneously used for SL communication. The processor reduces a SL power for the at least one first antenna panel based on the DL pathloss, while ignoring the DL pathloss for SL power control for the remaining antenna panels used for SL communication.

In some embodiments, identifying the at least one first antenna panel facing the RAN node includes identifying an antenna panel used for communication and/or measurement with the RAN node, wherein the remaining antenna panels are not used for communication and/or measurement with the RAN node. In certain embodiments, identifying at least one first antenna panel facing the RAN node further includes identifying a second antenna panel within a threshold boresight angle of the antenna panel used for communication and/or measurement with the RAN node, wherein the remaining antenna panels do not include the second antenna panel. In certain embodiments, identifying at least one first antenna panel facing the RAN node includes measuring a RS from the base station, wherein an antenna panel is identified as facing the RAN node if a measured signal strength exceeds a threshold amount.

In some embodiments, the processor estimates a pathloss for each of the plurality of antenna panels, where an open loop power control for the at least one antenna panel facing the base unit is based on the DL pathloss and where an open loop power control for the remaining antenna panels is based on a SL pathloss. In certain embodiments, open-loop power control parameters of P0 and alpha are separately configured for each of the plurality of antenna panels based on the configuration of DL pathloss and/or SL pathloss.

Disclosed herein is a third method for directional transmission/reception of groupcast and unicast communication, according to embodiments of the disclosure. The third method may be performed by a UE, such as the remote unit 105, the user equipment apparatus 800, and/or any of the V2X UEs (e.g., UE-A 301, UE-B 303, UE-C 305 and/or UE-D 307. The third method includes identifying a DL pathloss between the UE (i.e., remote unit) and a RAN node (i.e., base unit or gNB) and identifying at least one first antenna panel facing the RAN node and simultaneously used for SL communication. Here, the UE includes a plurality of antenna panels used for SL communication. The third method includes reducing a SL power for the at least one first antenna panel based on the DL pathloss, while ignoring the DL pathloss for SL power control for the remaining antenna panels used for SL communication.

In some embodiments, identifying the at least one first antenna panel facing the RAN node includes identifying an antenna panel used for communication and/or measurement with the RAN node, wherein the remaining antenna panels are not used for communication and/or measurement with the RAN node. In certain embodiments, identifying at least one first antenna panel facing the RAN node further includes identifying a second antenna panel within a threshold boresight angle of the antenna panel used for communication and/or measurement with the RAN node, wherein the remaining antenna panels do not include the second antenna panel. In certain embodiments, identifying at least one first antenna panel facing the RAN node includes measuring a RS from the base station, wherein an antenna panel is identified as facing the RAN node if a measured signal strength exceeds a threshold amount.

In some embodiments, the third method includes estimating a pathloss for each of the plurality of antenna panels, where an open loop power control for the at least one antenna panel facing the RAN node is based on the DL pathloss and where an open loop power control for the remaining antenna panels is based on a SL pathloss. In certain embodiments, open-loop power control parameters of P0 and alpha are separately configured for each of the plurality of antenna panels based on the configuration of DL pathloss and/or SL pathloss.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
   at least one memory; and
   at least one processor coupled with the at least one memory and configured to cause the UE to:
   receive a sidelink ("SL") configuration for SL communication, the SL configuration indicating a SL grant and a physical uplink control channel ("PUCCH") resource for SL hybrid automatic repeat request ("SL HARQ") feedback;
   determine that SL HARQ feedback is disabled for a set of receiving UEs ("Rx UEs"); and
   transmit a positive acknowledgement on the PUCCH resource based at least in part on the SL HARQ feedback being disabled for the set of Rx UEs.

2. The UE of claim 1, wherein the at least one processor is configured to cause the UE to transmit, to the set of Rx UEs, Sidelink Control Information ("SCI") to indicate SL HARQ feedback is disabled.

3. The UE of claim 1, wherein the at least one processor is configured to cause the UE to receive downlink control information ("DCI") indicating that the SL configuration enables the SL HARQ feedback.

4. The UE of claim 1, wherein the at least one processor is configured to cause the UE to receive downlink control information ("DCI") indicating that the SL configuration indicates PUCCH feedback information for reporting a SL HARQ feedback status to a radio access network ("RAN") node, the PUCCH feedback information indicating PUCCH feedback timing and the PUCCH resource.

5. The UE of claim 1, wherein the at least one processor is configured to cause the UE to receive downlink control information ("DCI") from a radio access network ("RAN") node, wherein the DCI enables the SL HARQ feedback or indicates PUCCH feedback information for reporting a SL HARQ feedback status to the RAN node, the PUCCH feedback information indicating PUCCH feedback timing and the PUCCH resource.

6. The UE of claim 1, wherein the at least one processor is configured to cause the UE to transmit SL data via a SL groupcast transmission.

7. The UE of claim 1, wherein the at least one processor is configured to cause the UE to determine that a retransmission grant for a HARQ process associated with the SL grant is not required.

8. A method of wireless communication at a user equipment ("UE"), the method comprising:
   receiving a sidelink ("SL") configuration for SL communication, the SL configuration indicating a SL grant and a physical uplink control channel ("PUCCH") resource for SL hybrid automatic repeat request ("SL HARQ") feedback;
   determining that SL HARQ feedback is disabled for a set of receiving UEs ("Rx UEs"); and
   transmitting a positive acknowledgement on the PUCCH resource based at least in part on the SL HARQ feedback being disabled for the set of Rx UEs.

9. The method of claim 8, further comprising transmitting, to the set of Rx UEs, Sidelink Control Information ("SCI") to indicate the SL HARQ feedback is disabled.

10. The method of claim 8, further comprising receiving downlink control information ("DCI") indicating that the SL configuration enables the SL HARQ feedback.

11. The method of claim 8, further comprising receiving downlink control information ("DCI") indicating that the SL configuration indicates PUCCH feedback information for reporting HARQ feedback status to a radio access network ("RAN") node, the PUCCH feedback information indicating PUCCH feedback timing and the PUCCH resource.

12. The method of claim 8, further comprising receiving downlink control information ("DCI") from a radio access network ("RAN") node, wherein the DCI enables the HARQ feedback or indicates PUCCH feedback information for reporting HARQ feedback status to the RAN node, the PUCCH feedback information indicating PUCCH feedback timing and the PUCCH resource.

13. The method of claim 8, further comprising transmitting SL data via a SL groupcast transmission.

14. The method of claim 8, further comprising determining that a retransmission grant for a HARQ process associated with the SL grant is not required.

15. A base station for wireless communication, comprising:
   at least one memory; and
   at least one processor coupled with the at least one memory and configured to cause the base station to:
      transmit a sidelink ("SL") configuration for SL communication, the SL configuration indicating a SL grant and a physical uplink control channel ("PUCCH") resource for hybrid automatic repeat request ("HARQ") feedback,
      wherein SL HARQ feedback is disabled for a set of receiving user equipments ("Rx UEs"); and
      receive a positive acknowledgement from a transmitting user equipment (Tx UE) on the PUCCH resource based at least in part on the SL HARQ feedback being disabled for the set of Rx UEs.

16. The base station of claim 15, wherein the at least one processor is configured to cause the base station to transmit downlink control information ("DCI") indicating that the SL configuration enables the HARQ feedback.

17. The base station of claim 15, wherein the at least one processor is configured to cause the base station to transmit downlink control information ("DCI") indicating that the SL configuration indicates PUCCH feedback information for reporting a HARQ feedback status to a radio access network ("RAN") node, the PUCCH feedback information indicating PUCCH feedback timing and the PUCCH resource.

18. The base station of claim 15, wherein the at least one processor is configured to cause the base station to transmit downlink control information ("DCI"), wherein the DCI enables the HARQ feedback or indicates PUCCH feedback information for reporting a HARQ feedback status to the base station, the PUCCH feedback information indicating PUCCH feedback timing and the PUCCH resource.

* * * * *